(12) United States Patent
Yawata et al.

(10) Patent No.: US 8,169,738 B1
(45) Date of Patent: May 1, 2012

(54) FLUID DYNAMIC BEARING MECHANISM INCLUDING COMMUNICATING CHANNEL, SPINDLE MOTOR, AND DISK DRIVE APPARATUS

(75) Inventors: Atsushi Yawata, Kyoto (JP); Yoichi Sekii, Kyoto (JP); Junya Mizukami, Kyoto (JP); Tetsuya Maruyama, Kyoto (JP); Hirofumi Kojima, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/034,778

(22) Filed: Feb. 25, 2011

(30) Foreign Application Priority Data

Oct. 19, 2010 (JP) .................. 2010-234494

(51) Int. Cl.
*G11B 19/20* (2006.01)
(52) U.S. Cl. .................................... 360/99.08
(58) Field of Classification Search ........... 360/99.08
See application file for complete search history.

(56) References Cited

U.S. PATENT DOCUMENTS

| 6,961,214 B2 * | 11/2005 | Ameen et al. ............ 360/99.08 |
| 7,015,611 B2 * | 3/2006 | Tokunaga et al. ............ 310/90 |
| 7,133,250 B2 * | 11/2006 | Herndon et al. ............ 360/99.08 |
| 7,239,477 B2 * | 7/2007 | Aiello et al. ............ 360/99.08 |
| 2003/0048575 A1 | 3/2003 | Nishimura et al. |
| 2003/0108257 A1 | 6/2003 | Gomyo |
| 2003/0197438 A1 | 10/2003 | Oku |
| 2003/0230943 A1 | 12/2003 | Tokunaga et al. |
| 2003/0231813 A1 | 12/2003 | Gomyo et al. |
| 2005/0031237 A1 | 2/2005 | Gomyo et al. |
| 2006/0051001 A1 | 3/2006 | Nishimura et al. |
| 2006/0170300 A1 | 8/2006 | Kodama |
| 2007/0176503 A1 | 8/2007 | Yajima |
| 2008/0036302 A1 | 2/2008 | Kim et al. |
| 2008/0036318 A1 | 2/2008 | Lee et al. |
| 2008/0089626 A1 | 4/2008 | Gotoh et al. |
| 2009/0080819 A1 | 3/2009 | Rehm |

FOREIGN PATENT DOCUMENTS

| JP | 10-080091 A | 3/1998 |
| JP | 2001-065552 A | 3/2001 |
| JP | 2002-005171 A | 1/2002 |

* cited by examiner

*Primary Examiner* — Mark Blouin
(74) *Attorney, Agent, or Firm* — Keating & Bennett, LLP

(57) ABSTRACT

A fluid dynamic bearing mechanism includes a stationary bearing portion including a sleeve portion, and a rotating bearing portion including an outer rotating portion. A lubricating oil is arranged between the stationary and rotating bearing portions. A first dynamic pressure groove array is arranged in an upper surface of the sleeve portion or a lower surface of the outer rotating portion. A second dynamic pressure groove array is arranged in a surface of the outer rotating portion or a surface of the stationary bearing portion in a region between the first array and a liquid surface. An end of the second array closer to the liquid surface is arranged radially inward of an opposite end of the second array. An upper end opening of a communicating channel defined in the sleeve portion is arranged radially outward of a radially inner end of the first array.

20 Claims, 19 Drawing Sheets

FLUID DYNAMIC BEARING MECHANISM INCLUDING COMMUNICATING CHANNEL, SPINDLE MOTOR, AND DISK DRIVE APPARATUS

BACKGROUND OF THE INVENTION

1. Field of the Invention

The present invention relates to a fluid dynamic bearing mechanism including a communicating channel, and a spindle motor, and a disk drive apparatus including the fluid dynamic bearing mechanism.

2. Description of the Related Art

Conventionally, hard disk apparatuses and optical disk apparatuses have spindle motors designed to rotate disks installed therein. Such spindle motors include a stationary portion, which is fixed to a housing of the apparatus, and a rotating portion, which is arranged to rotate while supporting the disks. The spindle motors are arranged to produce a torque through magnetic flux generated between the stationary and rotating portions, thereby rotating the rotating portion with respect to the stationary portion.

The stationary and rotating portions of the spindle motors are connected to each other through a bearing mechanism. In particular, a fluid dynamic bearing mechanism using a lubricating oil arranged between the stationary and rotating portions has often been used in spindle motors in recent years. JP-A 2001-65552, for example, describes an example of a dynamic pressure bearing apparatus arranged to rotate one of a shaft member and a sleeve relative to the other through a dynamic pressure action of the lubricating oil.

Generation of an air bubble in the lubricating oil in the fluid dynamic bearing mechanism may lead to a decreased accuracy of the rotation of the rotating portion. There is therefore a demand for a technique for reducing the generation of air bubbles in order to improve stability and reliability of the fluid dynamic bearing mechanism. Although a decrease in rotation performance caused by an air bubble generally falls within a permissible range in view of the quality required of conventional fluid dynamic bearing mechanisms, there is still a demand to reduce or eliminate the probability that any air bubble will be generated in the lubricating oil, in order to further increase the quality of fluid dynamic bearing mechanisms.

SUMMARY OF THE INVENTION

A fluid dynamic bearing mechanism according to one of the preferred embodiments of the present invention includes a stationary bearing portion and a rotating bearing portion supported to be rotatable with respect to the stationary bearing portion.

The rotating bearing portion preferably includes a shaft portion and an outer rotating portion arranged to spread radially outward from an outer circumferential surface of the shaft portion. The stationary bearing portion preferably includes a sleeve portion including an upper surface arranged opposite a lower surface of the outer rotating portion, and a bearing hole in which the shaft portion is inserted. The stationary and rotating bearing portions have a lubricating oil arranged therebetween. The stationary bearing portion and the outer rotating portion have a liquid surface of the lubricating oil arranged therebetween.

The lower surface of the outer rotating portion or the upper surface of the sleeve portion includes a first dynamic pressure groove array provided therein which is arranged to induce a dynamic pressure in a substantially radially inward direction in a portion of the lubricating oil which is present between the lower surface of the outer rotating portion and the upper surface of the sleeve portion.

A surface of the outer rotating portion or a surface of the stationary bearing portion includes a second dynamic pressure groove array provided therein and arranged to induce a dynamic pressure directed to an interior of the fluid dynamic bearing mechanism in a portion of the lubricating oil which is present between the first dynamic pressure groove array and the liquid surface.

An end of the second dynamic pressure groove array which is closer to the liquid surface is arranged radially inward of an end of the second dynamic pressure groove array which is closer to the first dynamic pressure groove array.

The sleeve portion includes a communicating channel, which is separately provided from the bearing hole. The communicating channel preferably includes an upper end opening arranged in the upper surface of the sleeve portion and a lower end opening arranged in another portion of the sleeve portion. The upper end opening is arranged radially outward of a radially inner end of the first dynamic pressure groove array.

This preferred embodiment of the present invention enables the fluid dynamic bearing mechanism to achieve improved stability and reliability, by reducing or eliminating the probability that any air bubble will be produced in the lubricating oil.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a vertical direction is defined as a direction parallel or substantially parallel to a direction in which a central axis extends, and that a side on which an outer rotating portion is arranged and a side on which a sleeve portion is arranged in relation to each other are defined as an upper side and a lower side, respectively. The shape of each member and relative positions of different members will be described based on this assumption. It should be noted, however, that the above definitions of the vertical direction and the upper and lower sides are simply applied to facilitate the description provided herein, and should not be construed to restrict in any way the orientation of a fluid dynamic bearing mechanism, a spindle motor, or a disk drive apparatus according to any embodiment of the present invention when in actual use.

Figure 1:
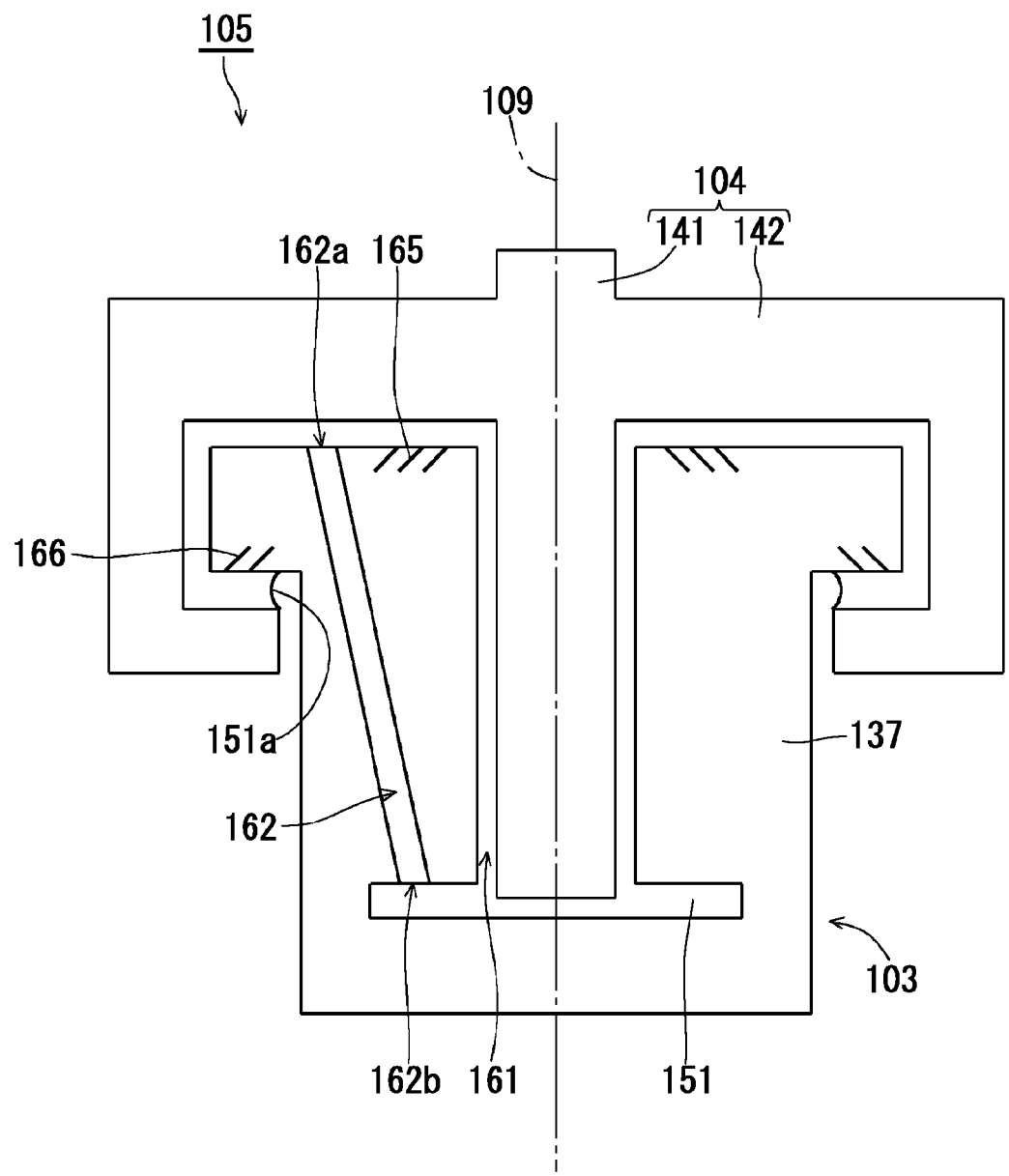
FIG. 1 is a conceptual diagram of a fluid dynamic bearing mechanism according to a preferred embodiment of the present invention.

FIG. 1 is a conceptual diagram of a fluid dynamic bearing mechanism 105 according to a preferred embodiment of the present invention. As illustrated in FIG. 1, the fluid dynamic bearing mechanism 105 preferably includes a stationary bearing portion 103 and a rotating bearing portion 104. The rotating bearing portion 104 is supported to be rotatable with respect to the stationary bearing portion 103.

The rotating bearing portion 104 preferably includes a shaft portion 141 and an outer rotating portion 142. The shaft portion 141 is preferably arranged to extend along a central axis 109 extending in the vertical direction. The outer rotating portion 142 is preferably arranged to spread radially outward from an outer circumferential surface of the shaft portion 141. The stationary bearing portion 103 preferably includes a sleeve portion 137. An upper surface of the sleeve portion 137 is preferably arranged opposite a lower surface of the outer rotating portion 142.

The sleeve portion 137 preferably includes a bearing hole 161 and a communicating channel 162, which is provided separately from the bearing hole 161. The shaft portion 141 is preferably arranged in the bearing hole 161. The communicating channel 162 is preferably arranged to connect an upper end opening 162a arranged in the upper surface of the sleeve portion 137, and a lower end opening 162b arranged in another portion of the sleeve portion 137.

A lubricating oil 151 is preferably arranged between the stationary bearing portion 103 and the rotating bearing portion 104. A liquid surface 151a of the lubricating oil 151 is preferably positioned between the stationary bearing portion 103 and the outer rotating portion 142.

In the present preferred embodiment, a first dynamic pressure groove array 165 is preferably arranged in the upper surface of the sleeve portion 137. The first dynamic pressure groove array 165 is preferably arranged to induce a dynamic pressure in the substantially radially inward direction in a portion of the lubricating oil 151 which is present between the lower surface of the outer rotating portion 142 and the upper surface of the sleeve portion 137, when the rotating bearing portion 104 is caused to rotate with respect to the stationary bearing portion 103. Note that the first dynamic pressure groove array 165 may be arranged in the lower surface of the outer rotating portion 142.

In addition, a second dynamic pressure groove array 166 is preferably arranged in a surface of the stationary bearing portion 103. The second dynamic pressure groove array 166 is preferably arranged to induce a dynamic pressure directed to an interior of the fluid dynamic bearing mechanism 105, in a portion of the lubricating oil 151 which is present between the first dynamic pressure groove array 165 and the liquid surface 151a, when the rotating bearing portion 104 is caused to rotate with respect to the stationary bearing portion 103. Note that the second dynamic pressure groove array 166 may be arranged in a surface of the outer rotating portion 142, if so desired.

An end of the second dynamic pressure groove array 166 which is arranged closer to the liquid surface 151a is preferably arranged radially inward of an end of the second dynamic pressure groove array 166 which is arranged closer to the first dynamic pressure groove array 165. Therefore, in the vicinity of the second dynamic pressure groove array 166, the lubricating oil 151 is preferably drawn toward the interior of the fluid dynamic bearing mechanism 105 by the action of both the second dynamic pressure groove array 166 and a centrifugal force. This contributes to effectively reducing or eliminating the probability that any air bubble will be generated in the lubricating oil 151 as compared to the case where the lubricating oil 151 is drawn toward the interior of the fluid dynamic bearing mechanism 105 by the action of only the second dynamic pressure groove array 166. Accordingly, the probability that any air bubble will be generated in the vicinity of the upper end opening 162a of the communicating channel 162 is also reduced or eliminated.

Moreover, the upper end opening 162a of the communicating channel 162 is preferably arranged radially outward of a radially inner end of the first dynamic pressure groove array 165. Therefore, even if any air bubble is generated in the lubricating oil 151, it is easy to discharge the air bubble to and out of the liquid surface 151a through the communicating channel 162 and the upper end opening 162a. An improvement in stability and reliability of the fluid dynamic bearing mechanism 105 is thus achieved.

Next, additional preferred embodiments of the present invention will be described below in further detail.

Figure 2:
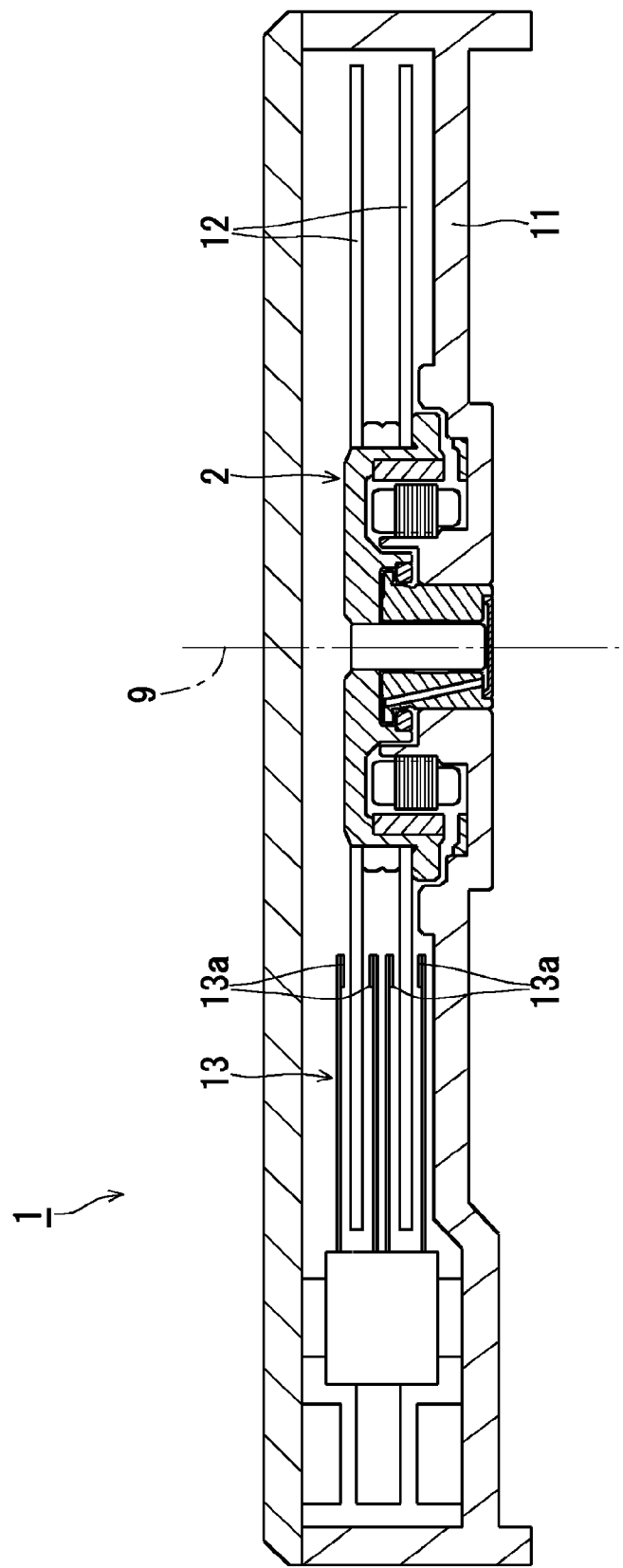
FIG. 2 is a schematic cross-sectional view of a disk drive apparatus according to a preferred embodiment of the present invention.

FIG. 2 is a schematic cross-sectional view of a disk drive apparatus 1 according to a preferred embodiment of the present invention. The disk drive apparatus 1 is preferably arranged to read and write information from or to magnetic disks (hereinafter referred to simply as "disks 12") while rotating the disks 12. As illustrated in FIG. 2, the disk drive apparatus 1 preferably includes an apparatus housing 11, the disks 12, an access portion 13, and a spindle motor 2.

The apparatus housing 11 is preferably arranged to contain the disks 12, the access portion 13, and the spindle motor 2. The access portion 13 is preferably arranged to move heads 13a along recording surfaces of the disks 12 as supported on the spindle motor 2 to read and write information from or to the disks 12. Note that the access portion 13 may be arranged to perform only one of reading and writing of information from or to the disks 12.

Figure 3:
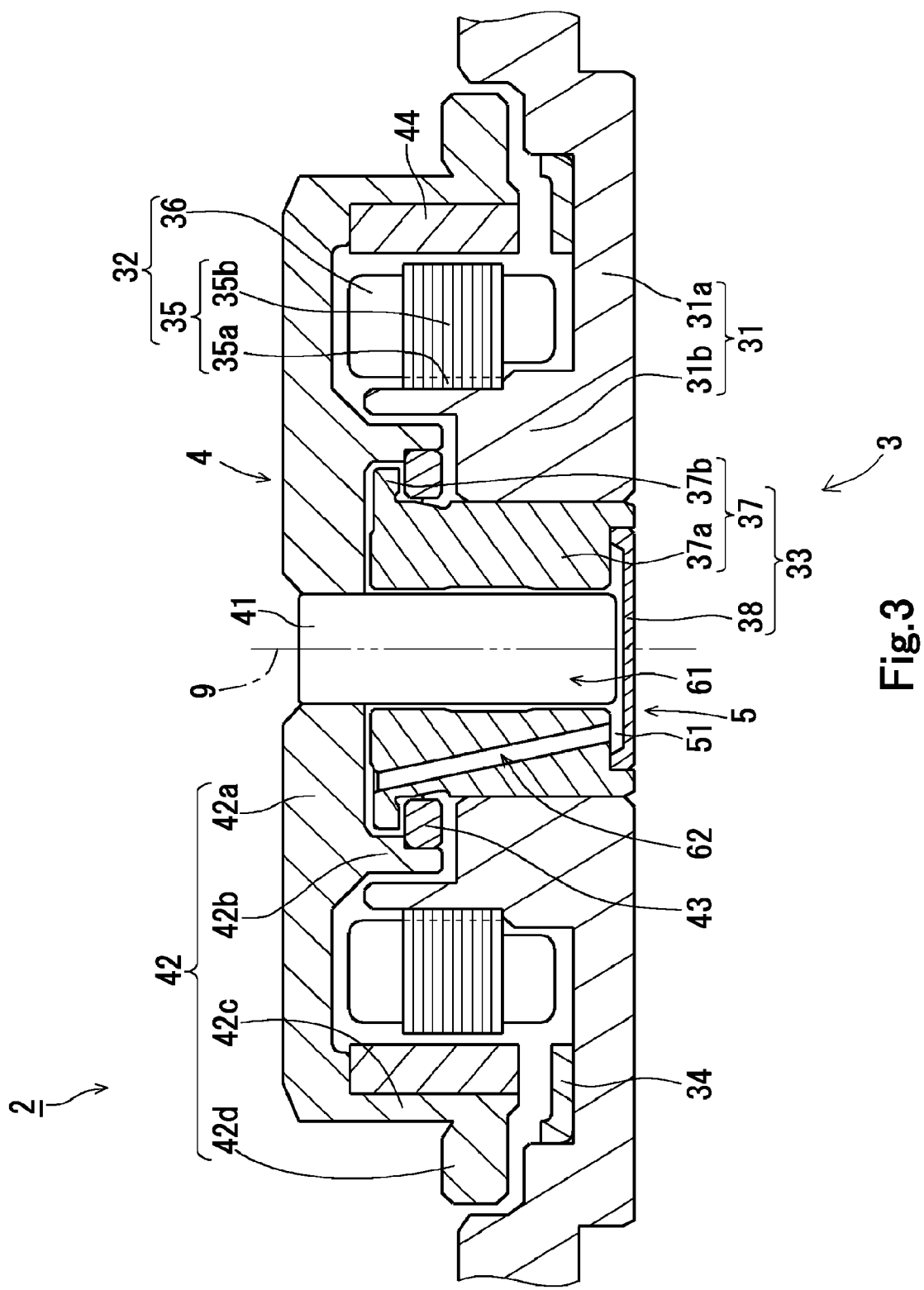
FIG. 3 is a schematic cross-sectional view of a spindle motor according to a preferred embodiment of the present invention.

Next, the structure of the spindle motor 2 will now be described below. FIG. 3 is a schematic cross-sectional view of the spindle motor 2. As illustrated in FIG. 3, the spindle motor preferably includes a stationary portion 3 and a rotating portion 4. The stationary portion 3 is preferably fixed to the apparatus housing 11 of the disk drive apparatus 1. The rotating portion 4 is preferably supported to be rotatable with respect to the stationary portion 3.

The stationary portion 3 preferably includes a base 31, a stator unit 32, a stationary bearing unit 33, and a magnetic member 34.

The base 31 preferably includes a bottom portion 31a arranged to spread radially, and a substantially cylindrical holder portion 31b arranged to project upward from a radially inner edge portion of the bottom portion 31a. In the present preferred embodiment, the base 31 defines a portion of the apparatus housing 11. The base 31 and the apparatus housing 11 are preferably made of a metal such as an aluminum alloy, for example. However, any other desirable material could be used for the base 31 and the apparatus housing 11. Note that the base 31 and the apparatus housing 11 may be defined by separate members.

The stator unit 32 preferably includes a stator core 35 and coils 36. The stator unit 32 is preferably arranged to generate magnetic flux in accordance with drive currents supplied to the coils 36. The stator core 35 preferably includes an annular core back 35a and a plurality of tooth portions 35b arranged to protrude radially outward from the core back 35a.

The core back 35a is preferably arranged outside an outer circumference of the holder portion 31b of the base 31. The stator core 35 is defined, for example, by laminated electromagnetic steel sheets, such as silicon steel sheets. Each coil 36 is preferably defined by a conducting wire wound around a separate one of the tooth portions 35b of the stator core 35.

The stationary bearing unit 33 is preferably arranged to support a shaft 41 included in the rotating portion 4, such that the shaft 41 is rotatable. The stationary bearing unit 33 preferably includes a sleeve 37 arranged opposite an outer circumferential surface of the shaft 41, and a closing member 38 arranged to close a lower side of the sleeve 37. The sleeve 37 is preferably arranged inside an inner circumference of the holder portion 31b of the base 31. In the present preferred embodiment, the sleeve 37 preferably defines a sleeve portion.

The sleeve 37 preferably includes a sleeve cylindrical portion 37a, which is substantially in the shape of a cylinder, and a flange portion 37b. In a substantial center of the sleeve cylindrical portion 37a, a bearing hole 61 is preferably arranged to pass through the sleeve cylindrical portion 37a in an axial direction. In addition, the sleeve cylindrical portion 37a preferably includes a communicating channel 62 arranged to extend from an upper surface to a lower surface thereof. The communicating channel 62 is preferably provided separately from the bearing hole 61. The flange portion 37b preferably includes a portion arranged to project radially outward from an upper end portion of an outer circumferential surface of the sleeve cylindrical portion 37a. The sleeve 37 is made of, for example, a metal such as stainless steel or a copper alloy. Note that the sleeve cylindrical portion 37a and the flange portion 37b may be defined by separate members. Also note that the sleeve 37 may be made of a porous sintered metal, for example.

The magnetic member 34 is preferably arranged on an upper surface of the bottom portion 31a of the base 31. The magnetic member 34 is preferably arranged to have a substantially annular shape. The magnetic member 34 is made, for example, of a magnetic substance, such as an electromagnetic steel sheet (e.g., a silicon steel sheet), a ferromagnetic stainless steel (e.g., SUS430, etc.), or a cold-rolled steel sheet (e.g., SPCC or SPCE). The magnetic member 34 is preferably arranged below a rotor magnet 44, which will be described below. The magnetic member 34 is preferably arranged to produce an axial magnetic attraction force in relation to the rotor magnet 44, so that the rotating portion 4 is attracted toward the stationary portion 3 through the magnetic attraction force.

The rotating portion 4 preferably includes the shaft 41, a hub 42, a flange receiving member 43, and the rotor magnet 44.

The shaft 41 is preferably arranged to extend along a central axis 9 in the vertical direction. The shaft 41 is preferably arranged to have a substantially columnar shape. The shaft 41 is preferably arranged inside the bearing hole 61 of the sleeve 37, and is supported to be rotatable with respect to the stationary bearing unit 33. In the present preferred embodiment, the shaft 41 preferably defines a shaft portion.

The hub 42 is preferably fixed to the shaft 41. The hub 42 is preferably arranged to rotate together with the shaft 41. The hub 42 preferably includes a flat portion 42a, a protruding portion 42b, a hub cylindrical portion 42c, and a mounting portion 42d. The flat portion 42a is preferably arranged to spread radially outward from the outer circumferential surface of the shaft 41. The protruding portion 42b is preferably arranged to protrude downward from a lower surface of the flat portion 42a. The hub cylindrical portion 42c is preferably arranged to extend downward from a radially outer edge portion of the flat portion 42a. The mounting portion 42d is preferably arranged to project radially outward from a lower end portion of the hub cylindrical portion 42c.

An outer circumferential surface of the hub cylindrical portion 42c is preferably arranged, at least in part, to be in contact with inner circumferential portions of the disks 12. In addition, an upper surface of the mounting portion 42d preferably includes a portion on which one of the disks 12 is mounted. That is, in the present preferred embodiment, the hub cylindrical portion 42c and the mounting portion 42d are arranged to define a support portion to support the disks 12. Note that the hub 42 and the shaft 41 may be defined by an integral single member, for example.

The flange receiving member 43 is preferably fixed to the protruding portion 42b of the hub 42. The flange receiving member 43 preferably has a substantially annular shape. The flange receiving member 43 is preferably arranged to extend radially inward from a lower end portion of the protruding portion 42b. An upper surface of the flange receiving member 43 is preferably arranged axially opposite a lower surface of the flange portion 37b of the sleeve 37. Note that the hub 42 and the flange receiving member 43 may be defined by an integral single member, for example.

The rotor magnet 44 is preferably fixed to an inner circumferential surface of the hub cylindrical portion 42c. The rotor magnet 44 preferably has a substantially annular shape and is centered on the central axis 9. An inner circumferential surface of the rotor magnet 44 is preferably arranged radially opposite to outer circumferential surfaces of the tooth portions 35b of the stator core 35. The inner circumferential surface of the rotor magnet 44 is preferably arranged to define a magnetic pole surface on which north and south poles are arranged such that the north and south poles alternate with each other.

Minute gaps are preferably defined between the stationary bearing unit 33 and the shaft 41, the hub 42, and the flange receiving member 43. A lubricating oil 51 is preferably arranged in these gaps. In addition, the communicating channel is preferably filled with the lubricating oil 51. A polyolester oil, a diester oil, or the like is preferably used as the lubricating oil 51, for example.

Once the drive currents are supplied to the coils 36 of the spindle motor 2 as described above, radial magnetic flux is generated about the tooth portions 35b of the stator core 35. Then, interaction between the magnetic flux of the tooth portions 35b and that of the rotor magnet 44 produces a circumferential torque, so that the rotating portion 4 is caused to rotate about the central axis 9 with respect to the stationary portion 3. The disks 12 supported by the hub 42 are also caused to rotate about the central axis 9 together with the rotating portion 4.

The shaft 41, the hub 42, and the flange receiving member 43 are preferably supported through the lubricating oil 51 to be rotatable with respect to the stationary bearing unit 33. That is, in the present preferred embodiment, the stationary bearing unit 33, the shaft 41, the hub 42, and the flange receiving member 43 together preferably define a fluid dynamic bearing mechanism 5 arranged to connect the stationary portion 3 and the rotating portion 4 in such a manner that the rotating portion 4 is rotatable relative to the stationary portion 3.

As a preferred example, the stationary bearing unit 33 is preferably arranged to define a stationary bearing portion of the fluid dynamic bearing mechanism 5. As a preferred example, the shaft 41, the hub 42, and the flange receiving member 43 are arranged to define a rotating bearing portion of the fluid dynamic bearing mechanism 5. Furthermore, in the present preferred embodiment, as a preferred example, the hub 42 and the flange receiving member 43 are arranged to together define an outer rotating portion of the rotating bearing portion. Furthermore, in the present preferred embodiment, as a preferred example, the flange receiving member 43 is arranged to define a flange receiving portion.

Figure 4:
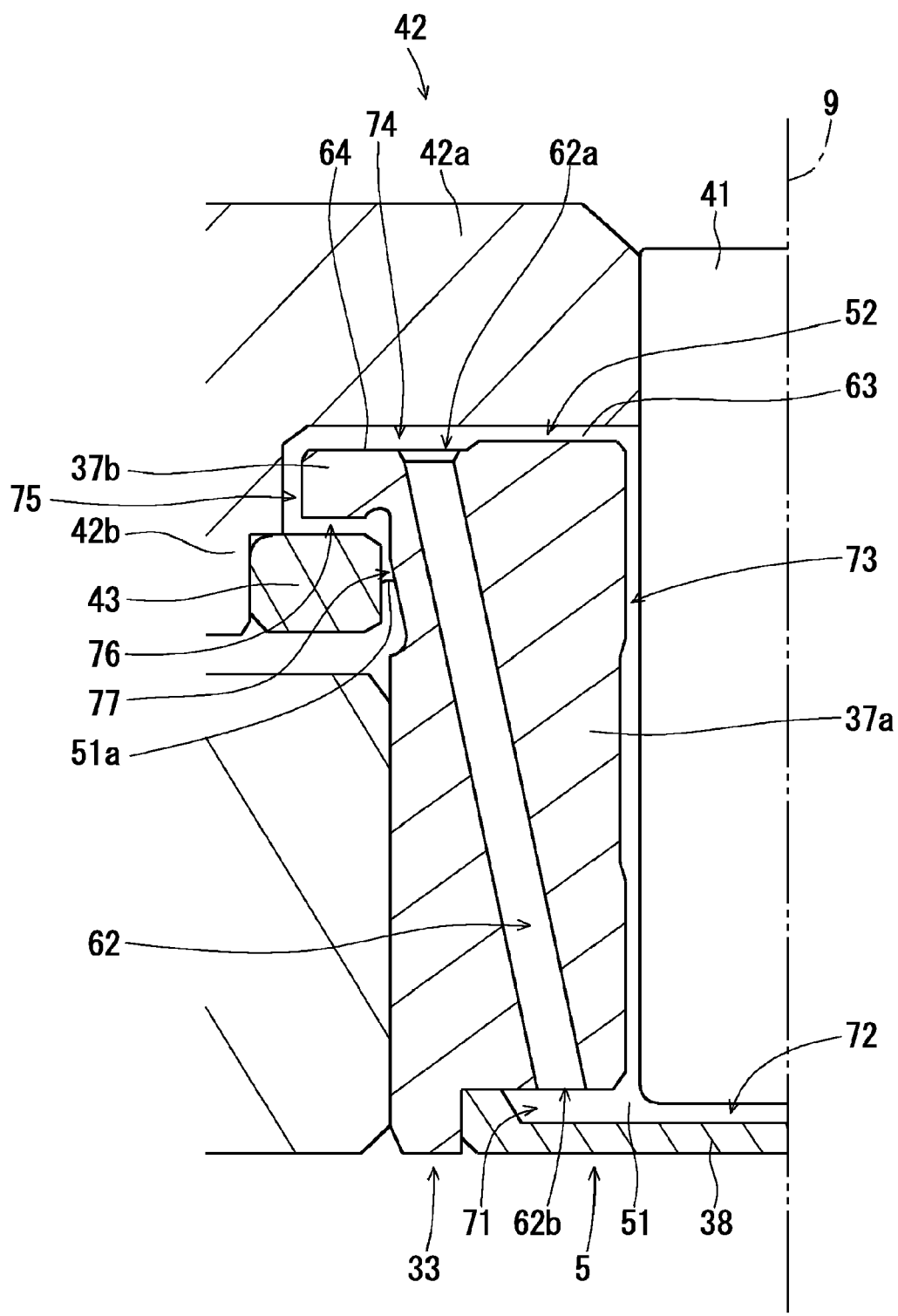
FIG. 4 is a schematic partial cross-sectional view of the spindle motor.

FIG. 4 is a schematic partial cross-sectional view of a preferred embodiment of a spindle motor 2, illustrating the fluid dynamic bearing mechanism 5 and its vicinity. As illustrated in FIG. 4, a first gap 71, a second gap 72, a third gap 73, a fourth gap 74, a fifth gap 75, a sixth gap 76, and a seventh gap 77 are preferably arranged between the stationary bearing portion and the rotating bearing portion. The first gap 71 preferably refers to a gap defined between the lower surface of the sleeve cylindrical portion 37a and an upper surface of the closing member 38. The second gap 72 preferably refers to a gap defined between a lower surface of the shaft 41 and the upper surface of the closing member 38. The third gap 73 preferably refers to a gap defined between an inner circumferential surface of the sleeve cylindrical portion 37a and the outer circumferential surface of the shaft 41. The fourth gap 74 preferably refers to a gap defined between the upper surface of the sleeve 37 and the lower surface of the flat portion 42a of the hub 42. The fifth gap 75 preferably refers to a gap defined between an outer circumferential surface of the flange portion 37b of the sleeve 37 and an inner circumferential surface of the protruding portion 42b of the hub 42. The sixth gap 76 preferably refers to a gap defined between the lower surface of the flange portion 37b of the sleeve 37 and the upper surface of the flange receiving member 43. The seventh gap 77 preferably refers to a gap defined between the outer circumferential surface of the sleeve cylindrical portion 37a and an inner circumferential surface of the flange receiving member 43. The first gap 71, the second gap 72, the third gap 73, the fourth gap 74, the fifth gap 75, the sixth gap 76, the seventh gap 77, and the communicating channel 62 are preferably arranged to define spaces which are in communication with one another. These communicating spaces are preferably filled with the lubricating oil 51.

The spaces filled with the lubricating oil 51 are preferably arranged to communicate with an outside only through the seventh gap 77. In the present preferred embodiment, as a preferred example, a single liquid surface 51a of the lubricating oil 51 is preferably positioned in the seventh gap 77. Note, however, that a plurality of liquid surfaces may be arranged between the sleeve 37 and the rotating bearing portion, if so desired.

As illustrated in FIG. 4, a bearing surface 63 and an annular surface 64, which is arranged radially outward of the bearing surface 63, are preferably arranged in the upper surface of the sleeve 37. Regarding the upper surface of the sleeve 37, the bearing surface 63 and its vicinity are preferably positioned at a level higher than that of a remaining portion of the upper surface of the sleeve 37. The height of the bearing surface 63 is therefore greater than the height of the annular surface 64. The bearing surface 63 and the annular surface 64 are preferably arranged axially opposite the lower surface of the flat portion 42a of the hub 42.

In the above described preferred embodiment of the present invention, as a preferred example, an upper end opening 62a of the communicating channel 62 is preferably arranged in the annular surface 64. That is, as a preferred example, the upper end opening 62a is arranged radially outward of the bearing surface 63. The upper end opening 62a according to the present preferred embodiment is arranged closer to the liquid surface 51a of the lubricating oil 51 than it would be if it were arranged radially inward of the bearing surface 63. Therefore, even if a negative pressure is produced in the third gap 73 or the like in the fluid dynamic bearing mechanism 5, which could potentially result in the generation of an air bubble in a portion of the lubricating oil 51 which is present in the third gap 73 or the like, the air bubble will be easily discharged to the liquid surface 51a through the communicating channel 62 and the upper end opening 62a thereof. Elimination of any air bubble out of the lubricating oil 51 preferably contributes to effectively reducing or preventing a decrease in rotational accuracy of the fluid dynamic bearing mechanism 5.

Meanwhile, a lower end opening 62b of the communicating channel 62 is preferably arranged in the lower surface of the sleeve cylindrical portion 37a. As illustrated in FIG. 4, the lower end opening 62b is preferably arranged radially inward of the upper end opening 62a. In addition, the communicating channel 62 is preferably arranged to extend obliquely with respect to the axial direction. A channel for the lubricating oil 51, which flows through the communicating channel 62 and an inside of the sleeve 37, is preferably shorter than it would be if the communicating channel were arranged to extend vertically in the axial direction. This contributes to effectively reducing the total amount of the lubricating oil 51 arranged in the fluid dynamic bearing mechanism 5. Note that the lower end opening 62b may be arranged in the inner circumferential surface of the sleeve cylindrical portion 37a, if so desired.

Figure 5:
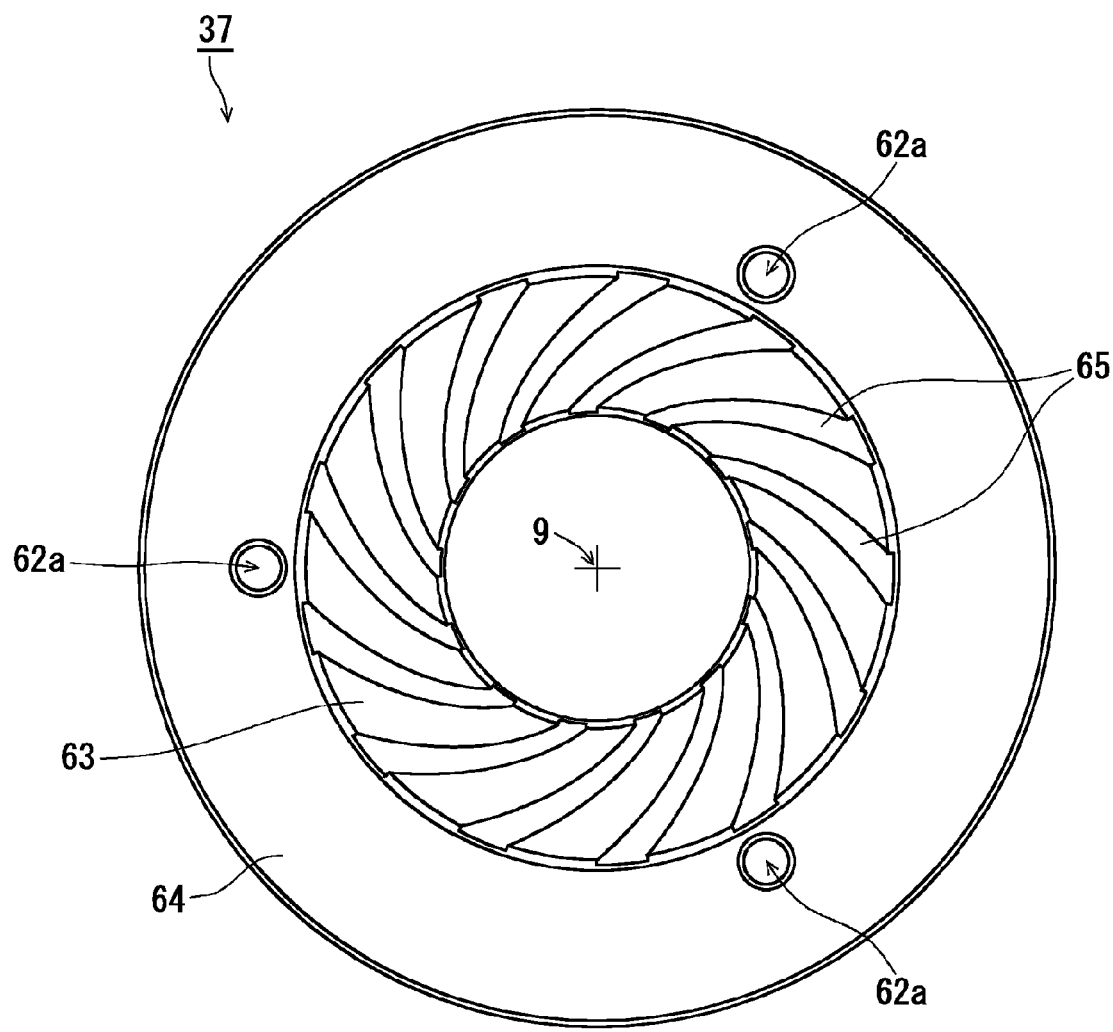
FIG. 5 is a schematic top view of a sleeve according to a preferred embodiment of the present invention.

FIG. 5 is a schematic top view of the sleeve 37. As illustrated in FIG. 5, a first dynamic pressure groove array 65 is preferably arranged in the bearing surface 63 of the sleeve 37. The first dynamic pressure groove array 65 is preferably defined by a plurality of spiral grooves centered on the central axis 9. The first dynamic pressure groove array 65 is preferably arranged to induce a dynamic pressure in the substantially radially inward direction in a portion of the lubricating oil 51 which is present between the bearing surface 63 and the lower surface of the flat portion 42a, when the hub 42 is caused to rotate with respect to the sleeve 37.

When the dynamic pressure is induced in the lubricating oil 51 through the first dynamic pressure groove array 65, the flat portion 42a of the hub 42 is supported so as to float above the bearing surface 63 through the lubricating oil 51. A thrust bearing portion 52 is thus defined in a region of the gap between the bearing surface 63 of the sleeve 37 and the lower surface of the flat portion 42a where the first dynamic pressure groove array 65 is arranged.

Figure 6:
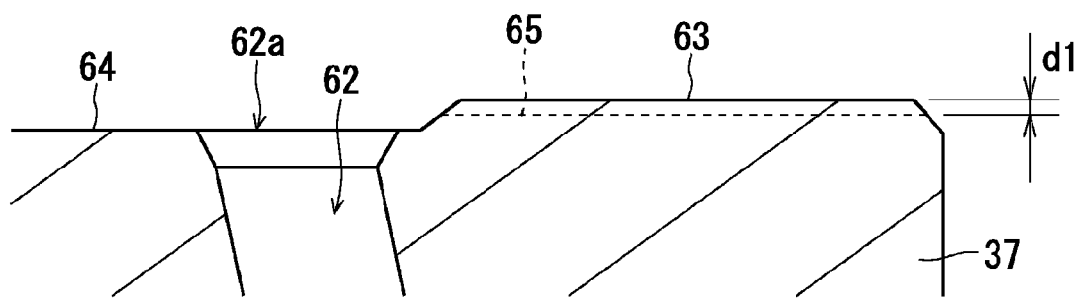
FIG. 6 is a schematic partial cross-sectional view of the sleeve.

FIG. 6 is a schematic partial cross-sectional view of the upper surface of the sleeve 37 and its vicinity. In FIG. 6, the first dynamic pressure groove array 65 is represented by a broken line. If the depth d1 of the grooves defining the first dynamic pressure groove array 65 is too great, it may be difficult to generate enough force to cause the hub 42 to float above the sleeve 37 in an initial stage of rotation. On the other hand, if the depth d1 of the grooves is too small, the degree of floating of the hub 42 during steady-state rotation may become too small.

In view of the above considerations, the depth d1 of the grooves defining the first dynamic pressure groove array 65 is preferably in a range, for example, of about 0.9 times to about 1.5 times the axial distance d2 (see FIG. 9) between the bearing surface 63 and the lower surface of the flat portion 42a during the steady-state rotation. To put it in specific numerical terms, the depth d1 of the grooves defining the first dynamic pressure groove array 65 is preferably in a range of about 3 μm to about 20 μm, more preferably in a range of about 5 μm to about 15 μm, for example.

As illustrated in FIG. 6, in the present preferred embodiment, the height of the annular surface 64 is preferably smaller than the height of bottom surfaces of the grooves defining the first dynamic pressure groove array 65. In addition, radially outer ends of the grooves defining the first dynamic pressure groove array 65 are preferably arranged to be open in the direction of the annular surface 64. This allows the lubricating oil 51 to smoothly flow between a space over the annular surface 64 and interior spaces of the grooves defining the first dynamic pressure groove array 65. The bearing surface 63 of the sleeve 37 and the lower surface of the flat portion 42a of the hub 42 will preferably be in contact with each other when the spindle motor 2 is inoperative. Even when they are in contact with each other, the lubricating oil 51 can be smoothly led from the space over the annular surface 64 into the interior spaces of the grooves defining the first dynamic pressure groove array 65. It is therefore possible to cause the spindle motor 2 to start rotating smoothly.

Note that the grooves defining the first dynamic pressure groove array 65 may not necessarily be arranged in a spiral shape. The first dynamic pressure groove array 65 may be defined, for example, by a groove array in a so-called herringbone pattern. Also note that it is enough that the first dynamic pressure groove array 65 be arranged in at least one of the upper surface of the sleeve 37 and the lower surface of the flat portion 42a of the hub 42, and that the first dynamic pressure groove array 65 may be arranged in both of the upper surface of the sleeve 37 and the lower surface of the flat portion 42a of the hub 42.

Figure 7:
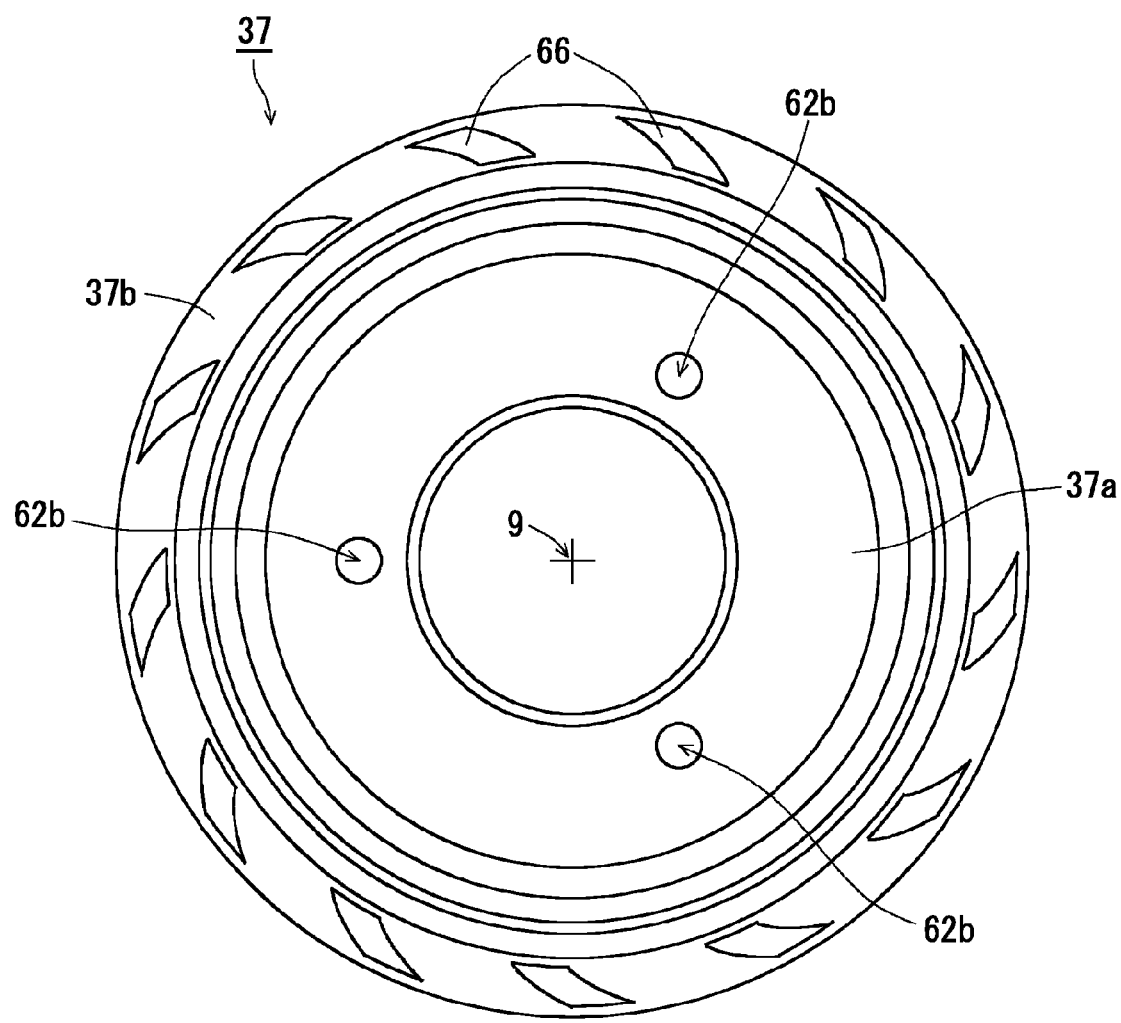
FIG. 7 is a schematic bottom view of the sleeve.

FIG. 7 is a schematic bottom view of the sleeve 37. As illustrated in FIG. 7, a second dynamic pressure groove array 66 is preferably arranged in the lower surface of the flange portion 37b of the sleeve 37. The second dynamic pressure groove array 66 is preferably defined by a plurality of spiral grooves centered on the central axis 9. The second dynamic pressure groove array 66 is preferably arranged to induce a dynamic pressure in the substantially radially outward direction in a portion of the lubricating oil 51 which is present between the flange portion 37b and the flange receiving member 43, when the flange receiving member 43 is caused to rotate with respect to the sleeve 37.

The second dynamic pressure groove array 66 is preferably arranged in the vicinity of the liquid surface 51a of the lubricating oil 51. The second dynamic pressure groove array is therefore arranged to draw a portion of the lubricating oil 51 which is present in the vicinity of the liquid surface 51a toward an interior of the fluid dynamic bearing mechanism 5, thereby preventing leakage of the lubricating oil 51 to the outside. In addition, an end of the second dynamic pressure groove array 66 which is closer to the liquid surface 51a is preferably arranged radially inward of an end of the second dynamic pressure groove array 66 which is closer to the first dynamic pressure groove array 65. Therefore, while the spindle motor 2 is rotating, a centrifugal force is produced in the vicinity of the second dynamic pressure groove array 66 to cause the lubricating oil 51 to be drawn radially outward.

In general, when a portion of a lubricating oil which is present in the vicinity of a liquid surface thereof is drawn inward by the action of dynamic pressure grooves, air bubbles tend to be easily introduced into the lubricating oil. In contrast, when a portion of the lubricating oil is drawn inward by the action of a centrifugal force, air bubbles tend not to be easily introduced into the lubricating oil. In the present preferred embodiment, the portion of the lubricating oil 51 which is present between the flange portion 37b and the flange receiving member 43 is preferably drawn toward the interior of the fluid dynamic bearing mechanism 5 by the action of both the second dynamic pressure groove array 66 and the centrifugal force. Therefore, generation of air bubbles in the lubricating oil 51 will be substantially prevented or reduced as compared to the case where the lubricating oil 51 is drawn toward the interior of the fluid dynamic bearing mechanism 5 by the action of only the second dynamic pressure groove array 66.

Moreover, because the lubricating oil 51 is drawn radially outward by the action of the second dynamic pressure groove array 66, a pressure on an inner portion of the lubricating oil 51 relative to the second dynamic pressure groove array 66 can be maintained at a level higher than that of atmospheric pressure. A pressure on an interior of the communicating channel 62 can also be maintained at a level higher than that of atmospheric pressure, for example. This reduces or eliminates the probability that a negative pressure will be caused in a clearance space which is located inward relative to the second dynamic pressure groove array 66, and also reduces or eliminates the probability that an air bubble will be produced as a result of occurrence of a negative pressure.

According to the present preferred embodiment, once a dynamic pressure is induced in the lubricating oil 51 by the action of the second dynamic pressure groove array 66, an axial bearing force is produced between the lower surface of the flange portion 37b and the upper surface of the flange receiving member 43. In other words, together with the first dynamic pressure groove array 65, the second dynamic pressure groove array 66 is also arranged to function as a component to axially support the rotating portion 4. Note, however, that the second dynamic pressure groove array 66 may not necessarily be arranged to induce an axial bearing force.

Also note that the grooves defining the second dynamic pressure groove array 66 may not necessarily be arranged in a spiral shape. The second dynamic pressure groove array 66 may be defined, for example, by a groove array in a so-called herringbone pattern. Also note that it is enough that the second dynamic pressure groove array 66 be arranged in at least one of the lower surface of the flange portion 37b and the upper surface of the flange receiving member 43, and that the second dynamic pressure groove array 66 may be arranged in both of the lower surface of the flange portion 37b and the upper surface of the flange receiving member 43. Also note that the second dynamic pressure groove array 66 may be arranged to extend, for example, over a wide area including the outer circumferential surface of the flange portion 37b and/or the upper surface of the sleeve 37, instead of being confined to the lower surface of the flange portion 37b.

In the present preferred embodiment, the sum of the areas of the grooves defining the first dynamic pressure groove array 65 is preferably arranged to be greater than the sum of the areas of the grooves defining the second dynamic pressure groove array 66. This effectively reduces or eliminates the probability that a pressure on a portion of the lubricating oil which is present between the first and second dynamic pressure groove arrays 65 and 66 will increase so greatly as to raise the hub 42 excessively.

Parameters other than the total areas of the first and second dynamic pressure groove arrays 65 and 66 may be adjusted to reduce or eliminate the probability that the pressure on the portion of the lubricating oil 51 which is present between the first and second dynamic pressure groove arrays 65 and 66 will increase so greatly as to raise the hub 42 excessively. For example, the sum of the lengths of the grooves defining the first dynamic pressure groove array 65 may be arranged to be greater than the sum of the lengths of the grooves defining the second dynamic pressure groove array 66. Alternatively, the sum of the volumes of the grooves defining the first dynamic pressure groove array 65 may be arranged to be greater than the sum of the volumes of the grooves defining the second dynamic pressure groove array 66. Any of these arrangements may be adopted to effectively reduce or eliminate the probability that the pressure on the portion of the lubricating oil 51 which is present between the first and second dynamic pressure groove arrays 65 and 66 will increase so greatly as to raise the hub 42 excessively.

The pressure on the portion of the lubricating oil 51 which is present between the first and second dynamic pressure groove arrays 65 and 66 is preferably arranged to be smaller than a pressure on a portion of the lubricating oil 51 which is positioned radially inward of the first dynamic pressure groove array 65 while the spindle motor 2 is rotating in a steady state. This pressure relationship contributes to effectively reducing or eliminating the probability that the hub 42 will be raised excessively. Moreover, the pressure on the portion of the lubricating oil 51 which is present between the first and second dynamic pressure groove arrays 65 and 66 is preferably arranged to be greater than atmospheric pressure. This pressure relationship contributes to reducing or eliminating the probability that a negative pressure will be produced in any gap. This in turn contributes to reducing or eliminating the probability that any air bubble will be produced in the lubricating oil 51.

Figure 8:
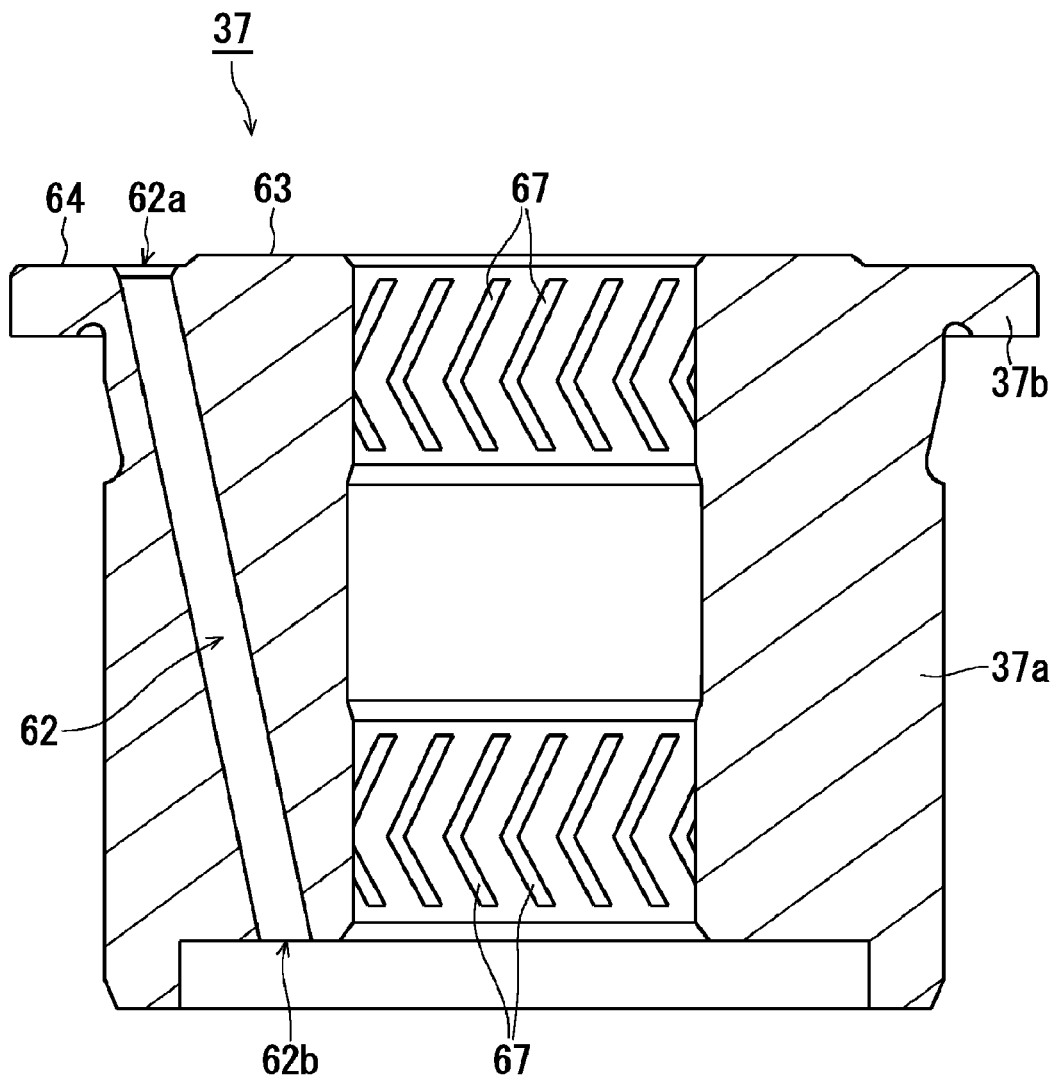
FIG. 8 is a schematic cross-sectional view of the sleeve.

FIG. 8 is a schematic cross-sectional view of the sleeve 37. As illustrated in FIG. 8, a plurality of third dynamic pressure groove arrays 67 (e.g., preferably two in the present preferred embodiment) are arranged in the inner circumferential surface of the sleeve 37 such that they are spaced from one other in the vertical direction. Each third dynamic pressure groove array 67 is preferably defined by a groove array in a so-called herringbone pattern. The third dynamic pressure groove arrays 67 are preferably arranged to induce a dynamic pressure in a portion of the lubricating oil 51 which is present between the sleeve 37 and the shaft 41 when the shaft 41 is caused to rotate with respect to the sleeve 37.

The radial distance d3 (see FIG. 9) between the inner circumferential surface of the sleeve 37 and the outer circumferential surface of the shaft 41 is preferably in a range of about 1 µm to about 5 µm, for example, in order to improve a supporting force for the shaft 41 with respect to the sleeve 37. More preferably, the radial distance d3 is in a range of about 2 µm to about 3 µm, for example.

Note that it is enough that the third dynamic pressure groove arrays 67 be arranged in at least one of the inner circumferential surface of the sleeve 37 and the outer circumferential surface of the shaft 41, and that the third dynamic pressure groove arrays 67 may be arranged in both of the inner circumferential surface of the sleeve 37 and the outer circumferential surface of the shaft 41.

Figure 9:
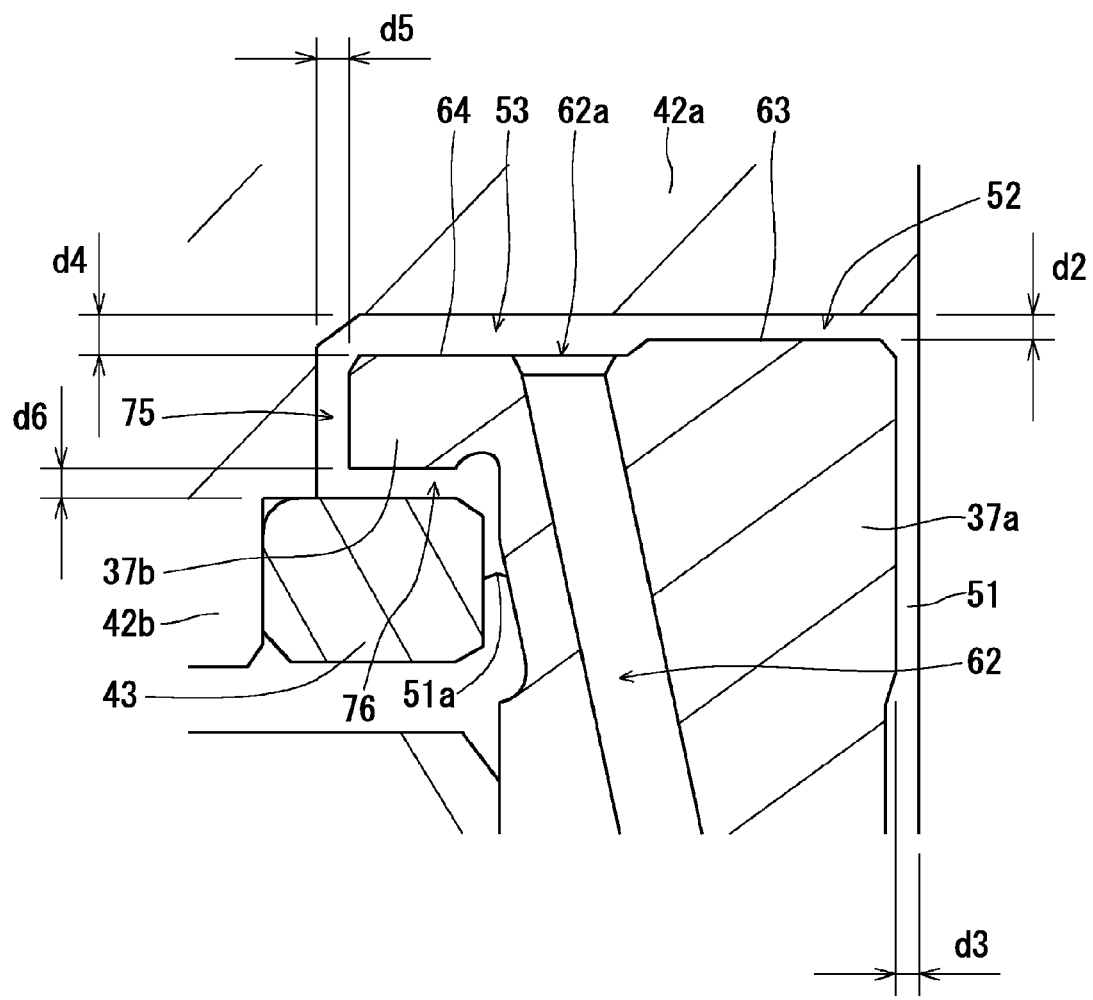
FIG. 9 is a schematic partial cross-sectional view of the fluid dynamic bearing mechanism.

FIG. 9 is a schematic partial cross-sectional view of the fluid dynamic bearing mechanism 5, illustrating an upper end portion of the sleeve 37 and its vicinity.

The above-described thrust bearing portion 52 is arranged between the bearing surface 63 of the sleeve 37 and the lower surface of the flat portion 42a of the hub 42. In addition, an annular region 53 defined between the annular surface 64 and the lower surface of the flat portion 42a is preferably arranged radially outward of the thrust bearing portion 52.

The axial distance d4 between the annular surface 64 and the lower surface of the flat portion 42a in the annular region 53 is preferably greater than the axial distance d2 between the bearing surface 63 and the lower surface of the flat portion 42a in the thrust bearing portion 52. This contributes to reducing or preventing a rise in pressure on a portion of the lubricating oil 51 which is present in the annular region 53. Moreover, provision of the annular region 53 preferably contributes to effectively eliminating or reducing the probability that the hub 42 and the sleeve 37 will be brought into close proximity with each other to cause a rise of the value of a current.

The distance d2 between the bearing surface 63 of the sleeve 37 and the lower surface of the flat portion 42a is preferably in a range of about 3 µm to about 30 µm, for example. More preferably, the distance d2 is in a range of about 5 µm to about 20 µm. Meanwhile, the distance d4 between the annular surface 64 of the sleeve 37 and the lower surface of the flat portion 42a is preferably in a range of about 10 µm to about 200 µm, for example. More preferably, the distance d4 is in a range of about 30 µm to about 70 µm, for example.

In the present preferred embodiment, the difference between the distances d2 and d4 is accomplished by a difference in height between the bearing surface 63 and the annular surface 64, both of which define portions of the upper surface of the sleeve 37. Note, however, that the difference between the distances d2 and d4 may be accomplished by a difference in height between two surfaces which define portions of the lower surface of the flat portion 42a of the hub 42.

In addition, in the present preferred embodiment, both the radial distance d5 across the fifth gap 75 and the axial distance d6 across the sixth gap 76 are preferably greater than the distance d2. This contributes to effectively reducing or preventing a rise of pressure on a portion of the lubricating oil 51 which is present in a region that is closer to the liquid surface 51a than is the thrust bearing portion 52, while allowing a high dynamic pressure to be induced in the thrust bearing portion 52. This in turn contributes to reducing or eliminating the probability that any air bubble will be introduced into the thrust bearing portion 52 through a vicinity of the upper end opening 62a of the communicating channel 62, and promoting discharge of any air bubble to the liquid surface 51a.

The discharge of any air bubble to the liquid surface 51a is further promoted when the distance d5 is greater than the distance d4. The distance d5 is preferably in a range of about 10 µm to about 200 µm, more preferably in a range of about 50 µm to about 100 µm, for example.

The rotating portion 4 of the spindle motor 2 is attracted downward through a magnetic attraction force generated between the magnetic member 34 and the rotor magnet 44. In addition, in the present preferred embodiment, an axial magnetic center of the stator core 35 is arranged at a level lower than that of an axial magnetic center of the rotor magnet 44. A magnetic attraction force generated between the stator core 35 and the rotor magnet 44 therefore has an axial component, for example.

The aforementioned magnetic attraction forces contribute to the aforementioned distances d2, d4, and d6, for example. That is, in the present preferred embodiment, the aforementioned distances d2, d4, and d6 are properly arranged by a combination of a dynamic pressure induced by the action of the first dynamic pressure groove array 65, the dynamic pressure induced by the action of the second dynamic pressure groove array 66, the magnetic attraction force generated between the magnetic member 34 and the rotor magnet 44, and the axial component of the magnetic attraction force generated between the stator core 35 and the rotor magnet 44.

Next, other preferred embodiments of the present invention will be described below. The following description of this preferred embodiment will focus on differences from the above-described preferred embodiment while descriptions of portions thereof which have essential counterparts in the above-described preferred embodiment are omitted.

Figure 10:
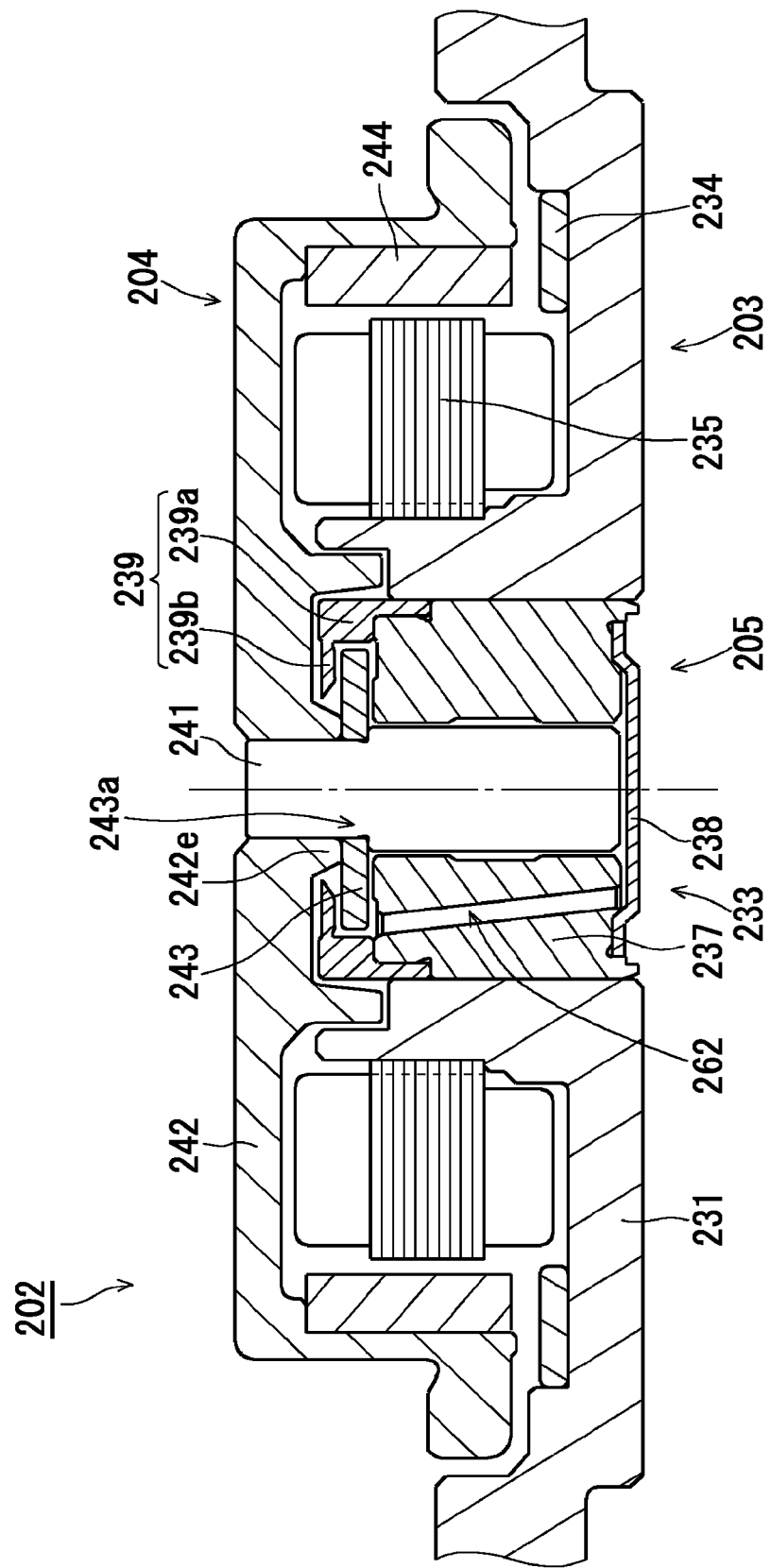
FIG. 10 is a schematic cross-sectional view of a spindle motor according to a preferred embodiment of the present invention.

FIG. 10 is a schematic cross-sectional view of a spindle motor 202 according to another preferred embodiment of the present invention. As illustrated in FIG. 10, a sleeve 237 according to the present preferred embodiment is not provided with a flange portion arranged to project radially outward. Instead, a cap 239 is preferably arranged on a top portion of the sleeve 237. That is, a stationary bearing unit 233 according to the present preferred embodiment includes the sleeve 237, a closing member 238, and the cap 239.

The cap 239 preferably includes a substantially cylindrical wall portion 239a and a plate-shaped visor portion 239b. A bottom portion of the wall portion 239a is preferably fixed to an upper surface of the sleeve 237. The visor portion 239b is preferably arranged to extend radially inward from an upper end portion of the wall portion 239a. Note that the sleeve 237 and the cap 239 may be defined by a single member, for example.

A rotating portion 204 according to the present preferred embodiment preferably includes a substantially flat plate 243. A circular hole 243a is preferably defined in a center of the plate 243. A shaft 241 is preferably arranged inside the circular hole 243a. An inner circumferential portion of the plate 243 is preferably arranged axially between an upper surface of a shoulder defined in the shaft 241 and a downward projection portion 242e defined in a radially inner end portion of a hub 242. The plate 243 is preferably arranged above the sleeve 237 and below the visor portion 239b. A lower surface of the plate 243 is therefore arranged axially opposite the upper surface of the sleeve 237. Meanwhile, an upper surface of the plate 243 is preferably arranged axially opposite a lower surface of the visor portion 239b.

Note that the shaft 241 and the plate 243 may be defined by an integral single member, for example, if so desired.

Figure 11:
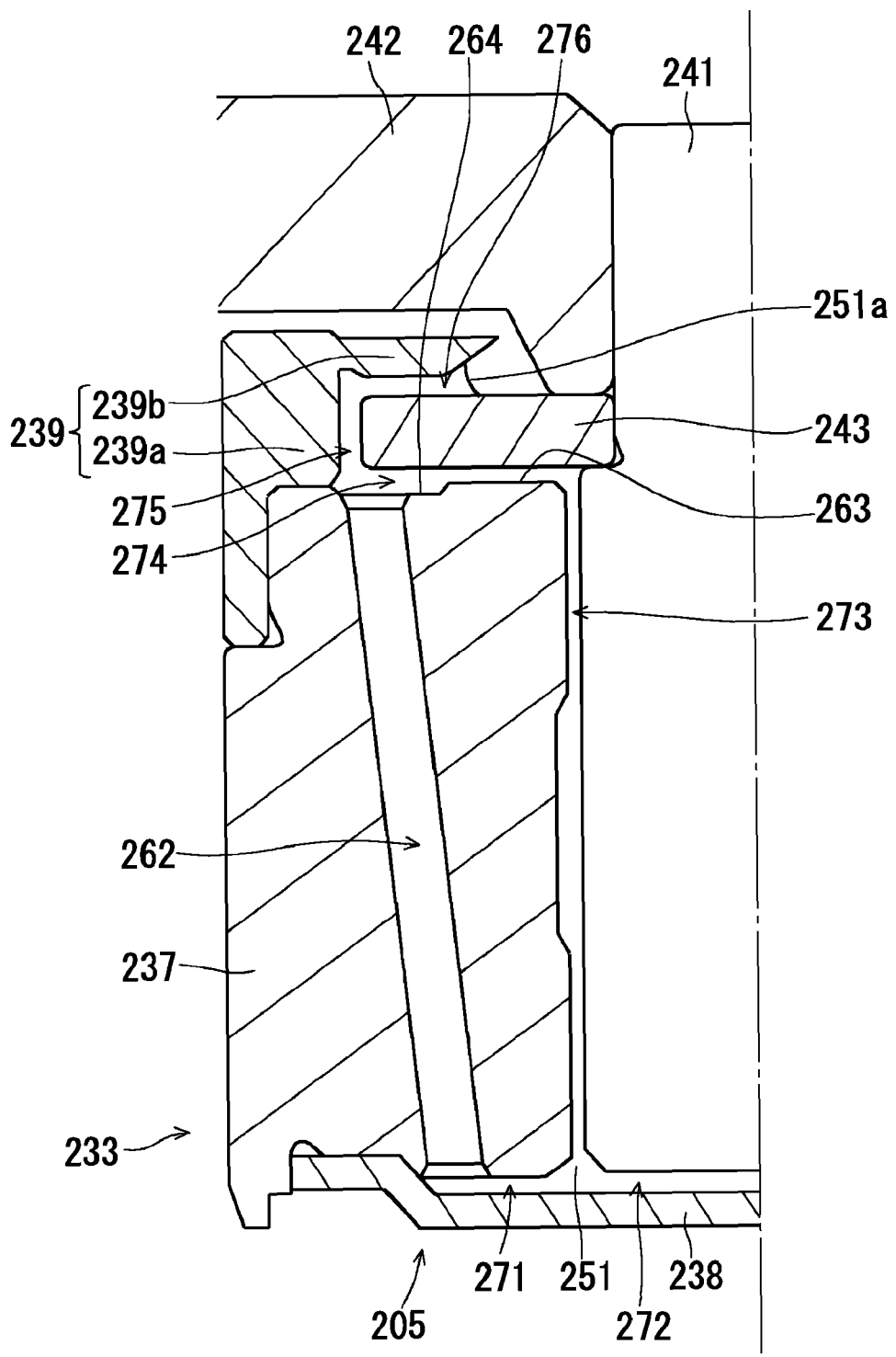
FIG. 11 is a schematic partial cross-sectional view of the spindle motor.

The shaft 241, the hub 242, and the plate 243 are supported through a lubricating oil 251 (as shown in FIG. 11) to be rotatable with respect to the stationary bearing unit 233. That is, in the present preferred embodiment, as a preferred example, the stationary bearing unit 233, the shaft 241, the hub 242, and the plate 243 together define a fluid dynamic bearing mechanism 205 arranged to connect a stationary portion 203 and the rotating portion 204 in such a manner that the rotating portion 204 is rotatable relative to the stationary portion 203.

As a preferred example, the stationary bearing unit 233 is arranged to define a stationary bearing portion of the fluid dynamic bearing mechanism 205. As a preferred example, the shaft 241, the hub 242, and the plate 243 are arranged to together define a rotating bearing portion of the fluid dynamic bearing mechanism 205. Furthermore, in the present preferred embodiment, as a preferred example, the hub 242 and the plate 243 are arranged to together define an outer rotating portion of the rotating bearing portion.

FIG. 11 is a partial cross-sectional view of the spindle motor 202, illustrating the fluid dynamic bearing mechanism 205 and its vicinity. As illustrated in FIG. 11, a first gap 271, a second gap 272, a third gap 273, a fourth gap 274, a fifth gap 275, and a sixth gap 276 are defined between the stationary bearing portion and the rotating bearing portion. The first gap 271 refers to a gap defined between a lower surface of the sleeve 237 and an upper surface of the closing member 238. The second gap 272 refers to a gap defined between a lower surface of the shaft 241 and the upper surface of the closing member 238. The third gap 273 refers to a gap defined between an inner circumferential surface of the sleeve 237 and an outer circumferential surface of the shaft 241. The fourth gap 274 refers to a gap defined between the upper surface of the sleeve 237 and the lower surface of the plate 243. The fifth gap 275 refers to a gap defined between an inner circumferential surface of the wall portion 239a of the cap 239 and an outer circumferential surface of the plate 243. The sixth gap 276 refers to a gap defined between the lower surface of the visor portion 239b of the cap 239 and the upper surface of the plate 243. The first gap 271, the second gap 272, the third gap 273, the fourth gap 274, the fifth gap 275, the sixth gap 276, and a communicating channel 262 are arranged to define spaces which are in communication with one another. These spaces are preferably filled with the lubricating oil 251.

The spaces filled with the lubricating oil 251 are preferably arranged to communicate with an outside only through the sixth gap 276. In the present preferred embodiment, as a preferred example, a single liquid surface 251a of the lubricating oil 251 is preferably positioned in the sixth gap 276. Note, however, that a plurality of liquid surfaces may be arranged between the stationary bearing portion and the rotating bearing portion, for example.

Figure 12:
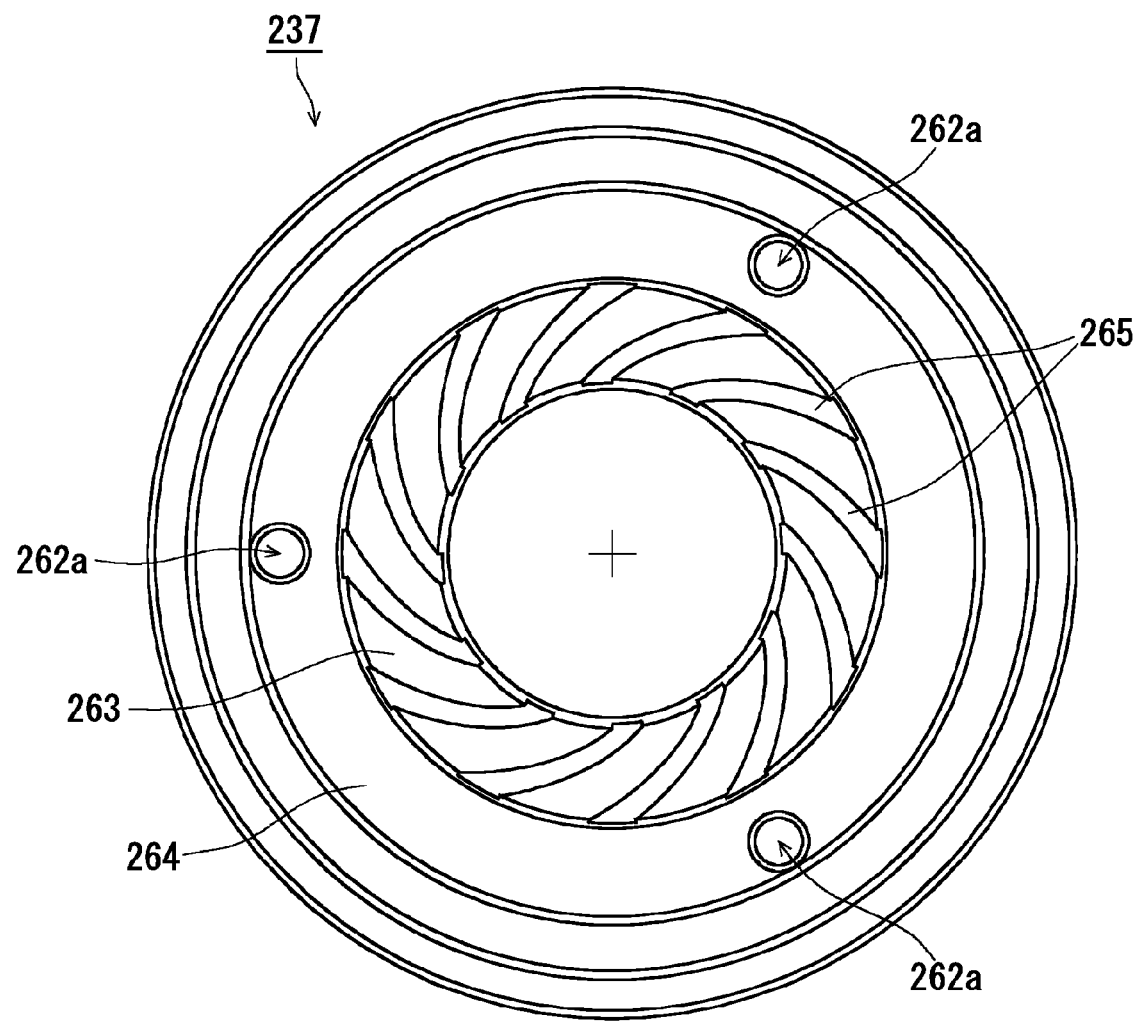
FIG. 12 is a schematic top view of a sleeve according to a preferred embodiment of the present invention.

FIG. 12 is a schematic top view of the sleeve 237. As illustrated in FIGS. 11 and 12, a bearing surface 263 and an annular surface 264, which is arranged radially outward of the bearing surface 263, are preferably arranged in the upper surface of the sleeve 237. A first dynamic pressure groove array 265 is preferably arranged in the bearing surface 263. The shape, dimensions, and action of the first dynamic pressure groove array 265 are substantially equivalent to those of the first dynamic pressure groove array 65 according to the above-described preferred embodiments. Note that it is enough that the first dynamic pressure groove array 265 be arranged in at least one of the upper surface of the sleeve 237 and the lower surface of the plate 243, and that the first dynamic pressure groove array 265 may be arranged in both of the upper surface of the sleeve 237 and the lower surface of the plate 243, for example.

Figure 13:
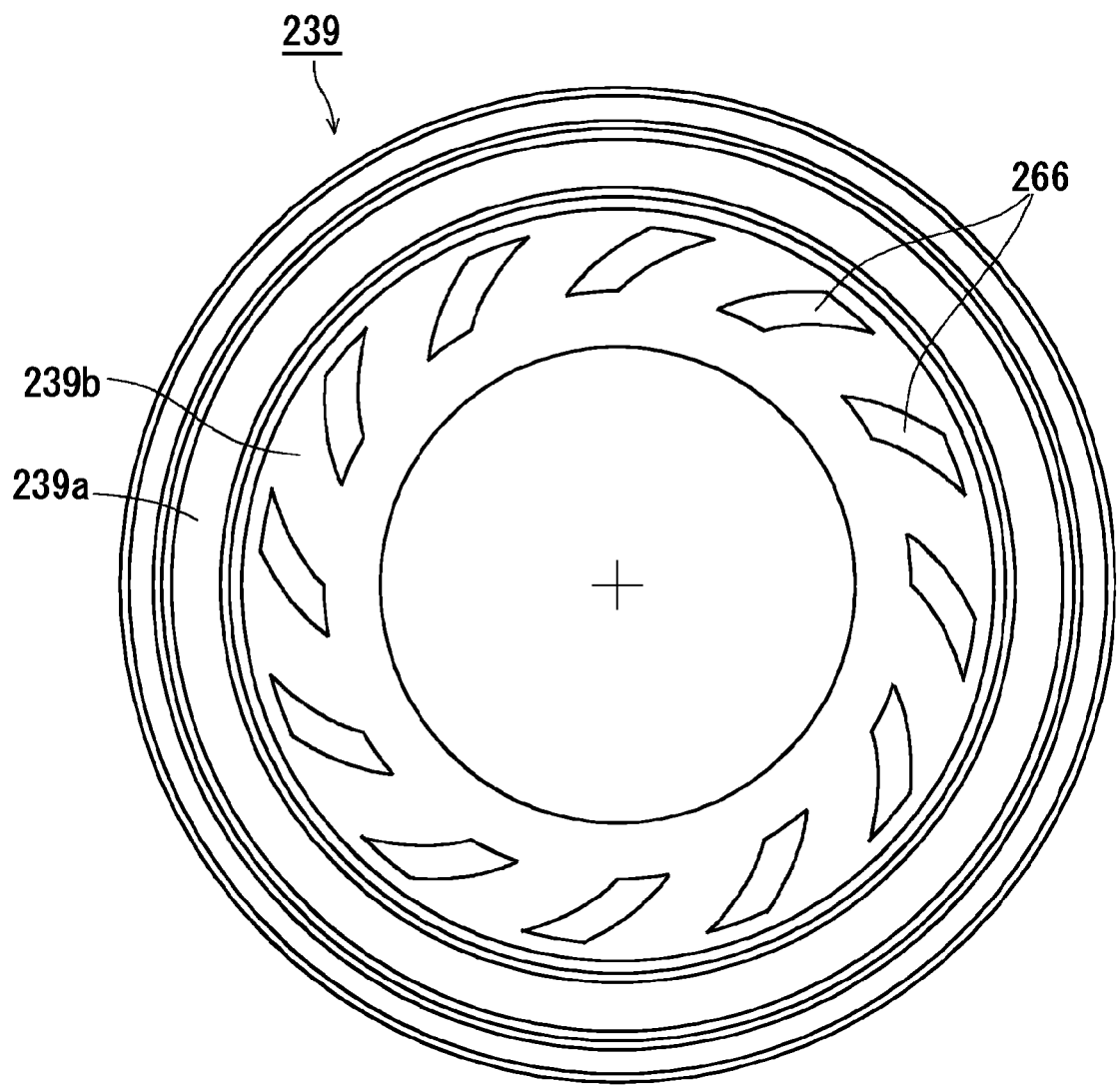
FIG. 13 is a schematic bottom view of a cap according to a preferred embodiment of the present invention.

FIG. 13 is a schematic bottom view of the cap 239. As illustrated in FIG. 13, a second dynamic pressure groove array 266 is preferably arranged in the lower surface of the visor portion 239b of the cap 239. The shape, dimensions, and action of the second dynamic pressure groove array 266 preferably are substantially equivalent to those of the second dynamic pressure groove array 66 according to the above-described preferred embodiments. Note that it is enough that the second dynamic pressure groove array 266 be arranged in at least one of the lower surface of the visor portion 239b of the cap 239 and the upper surface of the plate 243, and that the second dynamic pressure groove array 266 may be arranged in both of the lower surface of the visor portion 239b of the cap 239 and the upper surface of the plate 243, for example.

Relationships between the total area, dimensions, and total volume of the first dynamic pressure groove array 265 and the total area, dimensions, and total volume, respectively, of the second dynamic pressure groove array 266 are preferably substantially equivalent to the relationships between the total area, dimensions, and total volume of the first dynamic pressure groove array 65 and the total area, dimensions, and total volume, respectively, of the second dynamic pressure groove array 66 according to the above-described preferred embodiments. This effectively reduces or eliminates the probability that a pressure on a portion of the lubricating oil 251 which is present between the first and second dynamic pressure groove arrays 265 and 266 will increase to such a great extent that the plate 243 will be raised excessively.

Figure 14:
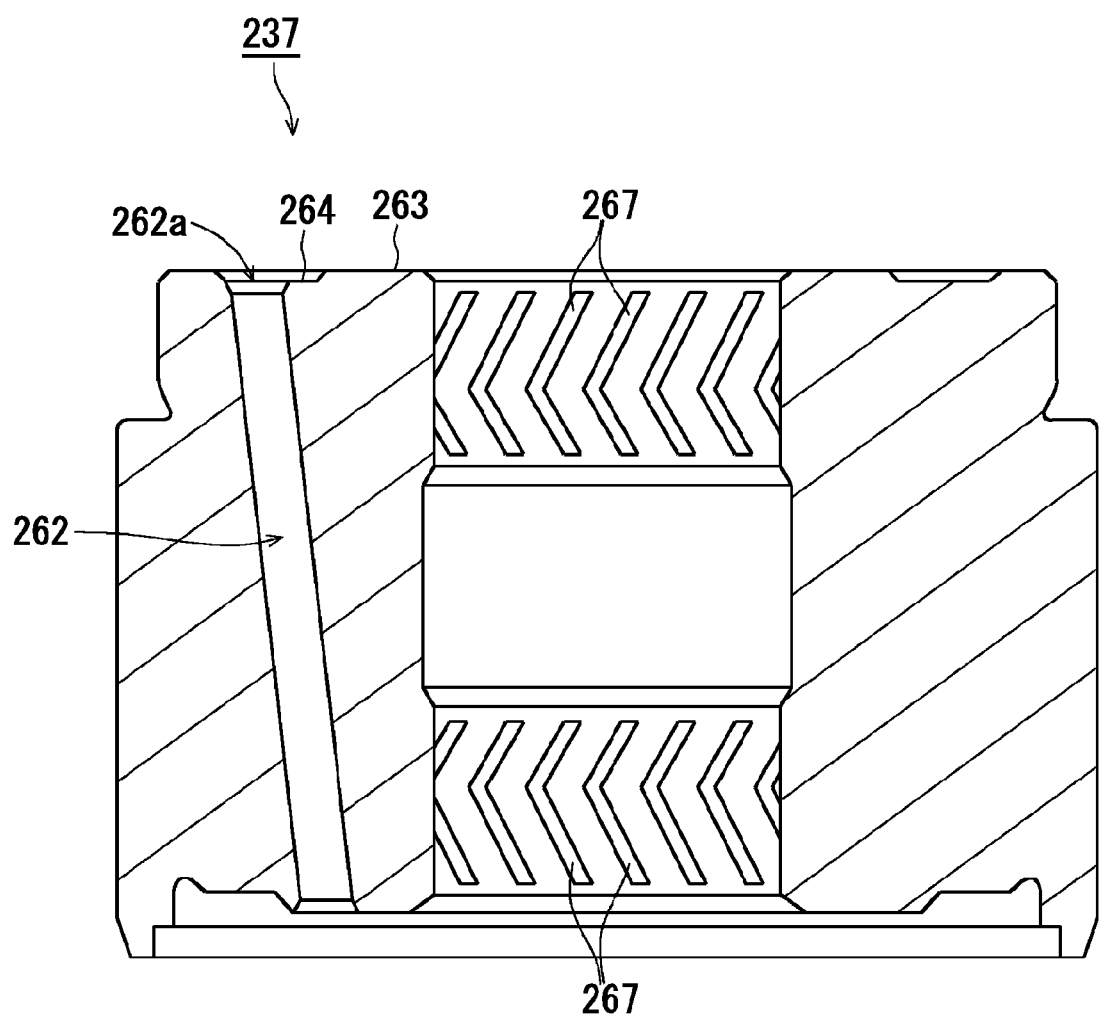
FIG. 14 is a schematic cross-sectional view of the sleeve.

FIG. 14 is a schematic cross-sectional view of the sleeve 237. As illustrated in FIG. 14, two third dynamic pressure groove arrays 267 are preferably arranged in the inner circumferential surface of the sleeve 237 such that they are spaced from each other in the vertical direction. The shapes, dimensions, and actions of the third dynamic pressure groove arrays 267 are preferably substantially equivalent to the shapes, dimensions, and actions, respectively, of the third dynamic pressure groove arrays 67 according to the above-described preferred embodiments.

Figure 15:
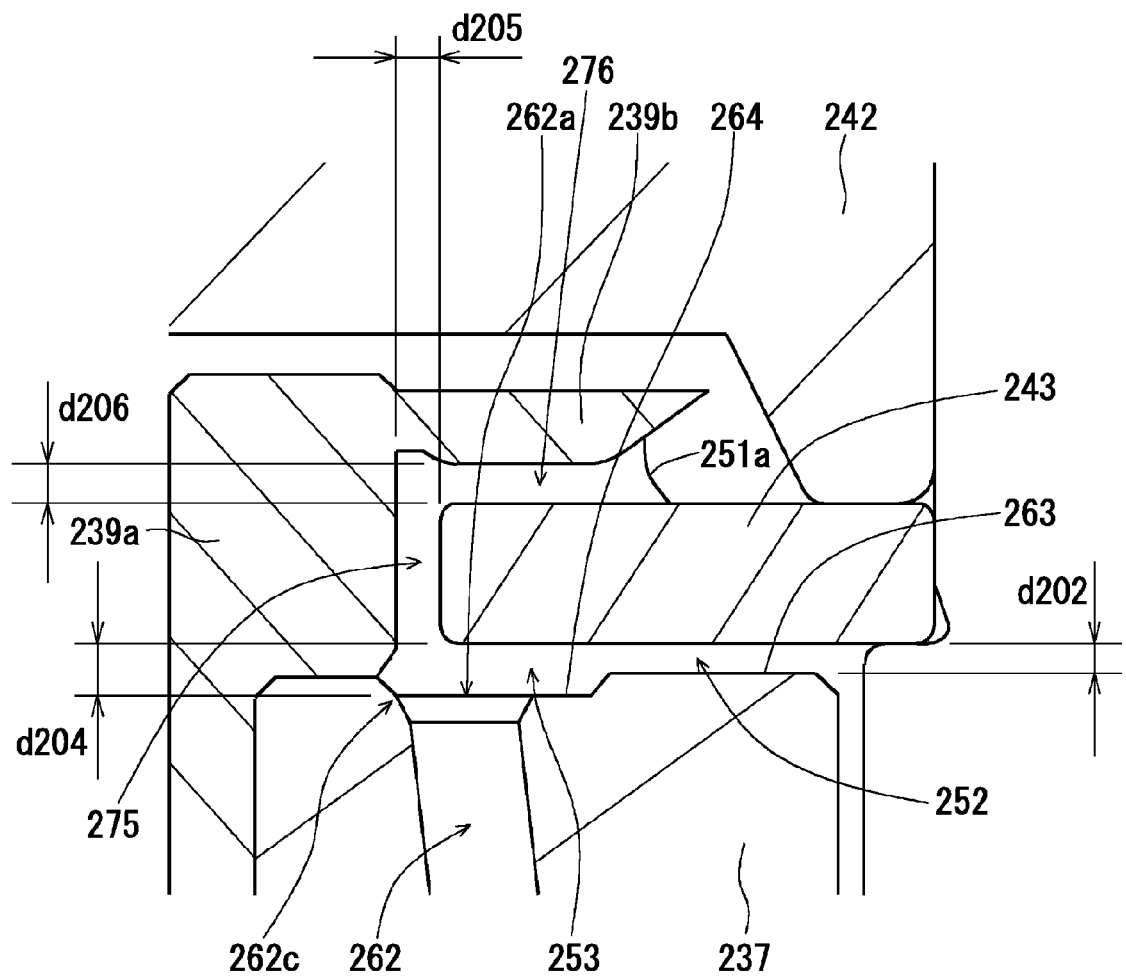
FIG. 15 is a schematic partial cross-sectional view of a fluid dynamic bearing mechanism according to a preferred embodiment of the present invention.

FIG. 15 is a schematic partial cross-sectional view of the fluid dynamic bearing mechanism 205, illustrating the plate 243 and its vicinity. A thrust bearing portion 252 is defined by the aforementioned first dynamic pressure groove array 265 between the bearing surface 263 of the sleeve 237 and the lower surface of the plate 243. Meanwhile, an annular region 253 defined between the annular surface 264 and the lower surface of the plate 243 is preferably arranged radially outward of the thrust bearing portion 252.

The axial distance d204 between the annular surface 264 and the lower surface of the plate 243 in the annular region 253 is preferably greater than the axial distance d202 between the bearing surface 263 and the lower surface of the plate 243 in the thrust bearing portion 252. This contributes to effectively reducing or preventing a rise of pressure on a portion of the lubricating oil 251 which is present in the annular region 253. Moreover, provision of the annular region 253 contributes to effectively reducing or eliminating the probability that the plate 243 and the sleeve 237 will be brought into close proximity with each other to cause a rise of the value of a current.

The distance d202 between the bearing surface 263 of the sleeve 237 and the lower surface of the plate 243 is preferably in a range of about 3 μm to about 30 μm, for example. More preferably, the distance d202 is in a range of about 5 μm to about 20 μm. Meanwhile, the distance d204 between the annular surface 264 of the sleeve 237 and the lower surface of the plate 243 is preferably in a range of about 10 μm to about 200 μm, for example. More preferably, the distance d204 is in a range of about 30 μm to about 70 μm, for example.

In the present preferred embodiments, the difference between the distances d202 and d204 is accomplished by a difference in height between the bearing surface 263 and the annular surface 264, both of which define portions of the upper surface of the sleeve 237. Note, however, that the difference between the distances d202 and d204 may be accomplished by a difference in height between two surfaces which define portions of the lower surface of the plate 243.

In addition, in the present preferred embodiment, both the radial distance d205 across the fifth gap 275 and the axial distance d206 across the sixth gap 276 are preferably greater than the distance d202. This contributes to effectively reducing or preventing a rise of pressure on a portion of the lubricating oil 251 which is present in a region that is closer to the liquid surface 251a than is the thrust bearing portion 252, while allowing a high dynamic pressure to be induced in the thrust bearing portion 252. This in turn contributes to effectively reducing or eliminating the probability that any air bubble will be introduced into the thrust bearing portion 252 through a vicinity of an upper end opening 262a of the communicating channel 262, and promoting discharge of any air bubble out through the liquid surface 251a.

The discharge of any air bubble to the liquid surface 251a is further promoted when the distance d205 is greater than the distance d204. The distance d205 is preferably in a range of about 10 μm to about 200 μm, more preferably in a range of about 50 μm to about 100 μm, for example.

In addition, in the present preferred embodiment, a radially outermost portion 262c of an edge portion of the upper end opening 262a of the communicating channel 262 is preferably arranged radially outward of an outer circumferential portion of the plate 243. This allows any air bubble to be smoothly discharged from the communicating channel 262 through the upper end opening 262a thereof to the liquid surface 251a.

Also in the present preferred embodiments, a magnetic member 234 is arranged on an upper surface of a base 231. The magnetic member 234 is preferably arranged to produce an axial magnetic attraction force in relation to a rotor magnet 244. In addition, an axial magnetic center of a stator core 235 is preferably arranged at a level lower than that of an axial magnetic center of the rotor magnet 244. A magnetic attraction force generated between the stator core 235 and the rotor magnet 244 therefore has an axial component, for example.

The aforementioned magnetic attraction forces contribute to the aforementioned distances d202, d204, and d206. That is, the aforementioned distances d202, d204, and d206 are properly arranged by a combination of a dynamic pressure induced by the action of the first dynamic pressure groove array 265, a dynamic pressure induced by the action of the second dynamic pressure groove array 266, the magnetic attraction force generated between the magnetic member 234 and the rotor magnet 244, and the axial component of the magnetic attraction force generated between the stator core 235 and the rotor magnet 244.

While preferred embodiments of the present invention have been described above, the present invention is not limited to the above-described preferred embodiments. A variety of variations and modifications thereof will now be described below, with a focus on differences thereof from the above-described preferred embodiments.

Figure 16:
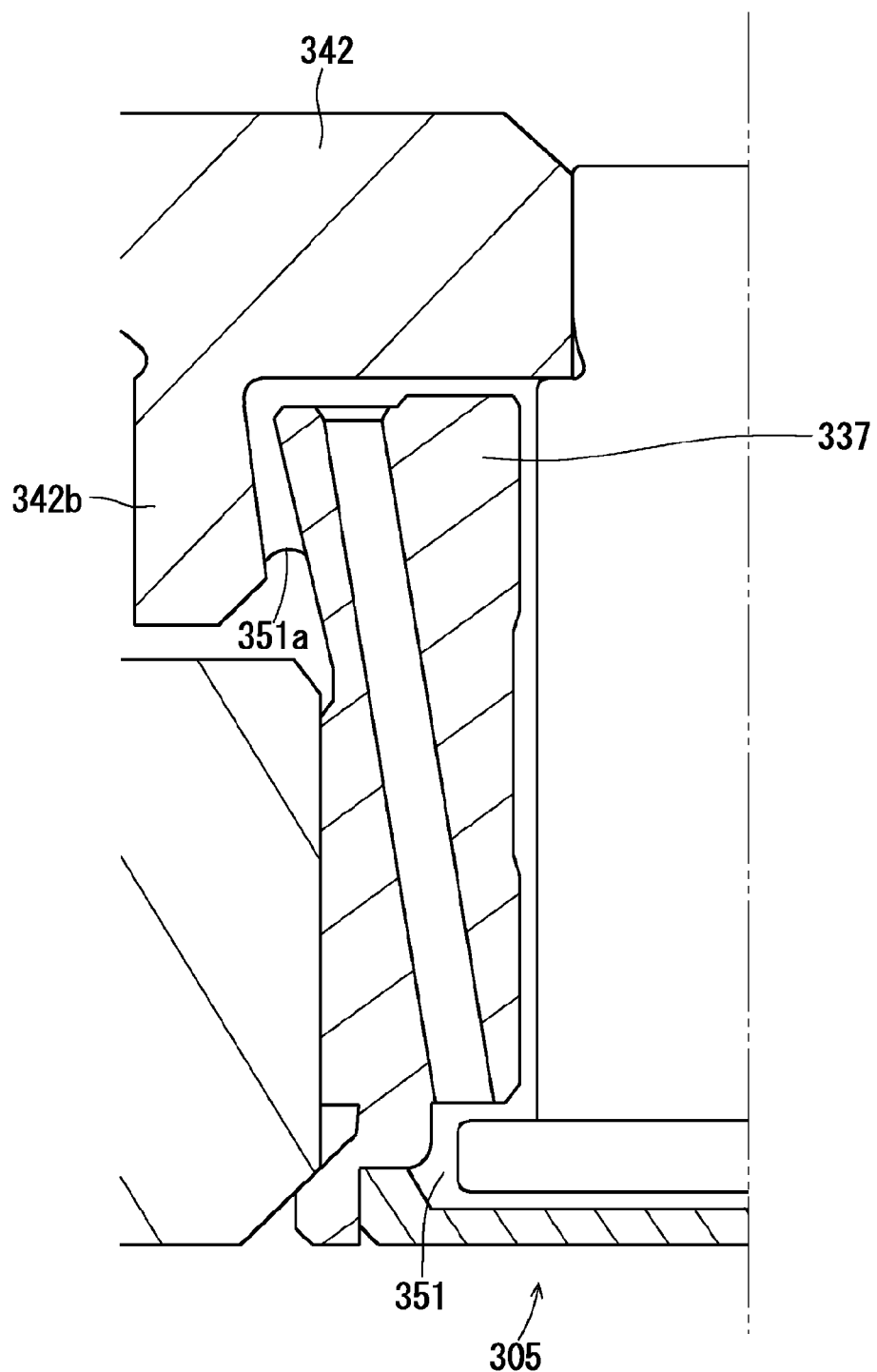
FIG. 16 is a schematic partial cross-sectional view of a spindle motor according to a preferred embodiment of the present invention.

FIG. 16 is a schematic partial cross-sectional view of a spindle motor according to an example modification, illustrating a fluid dynamic bearing mechanism 305 therein and its vicinity. In the example modification illustrated in FIG. 16, a protruding portion 342b of a hub 342 is not provided with a flange receiving member. Instead, an inner circumferential surface of the protruding portion 342b is arranged opposite an outer circumferential surface of a sleeve 337 with a slight angle with respect to the vertical. In addition, a liquid surface 351a of a lubricating oil 351 is preferably arranged between the inner circumferential surface of the protruding portion 342b and the outer circumferential surface of the sleeve 337. Thus, an outer circumferential surface of a top portion of the sleeve 337 and its vicinity function as a portion corresponding to the flange portion in the above-described preferred embodiment, while the inner circumferential surface of the protruding portion 342b and its vicinity function as a portion corresponding to the flange receiving member in the above-described preferred embodiment.

Figure 17:
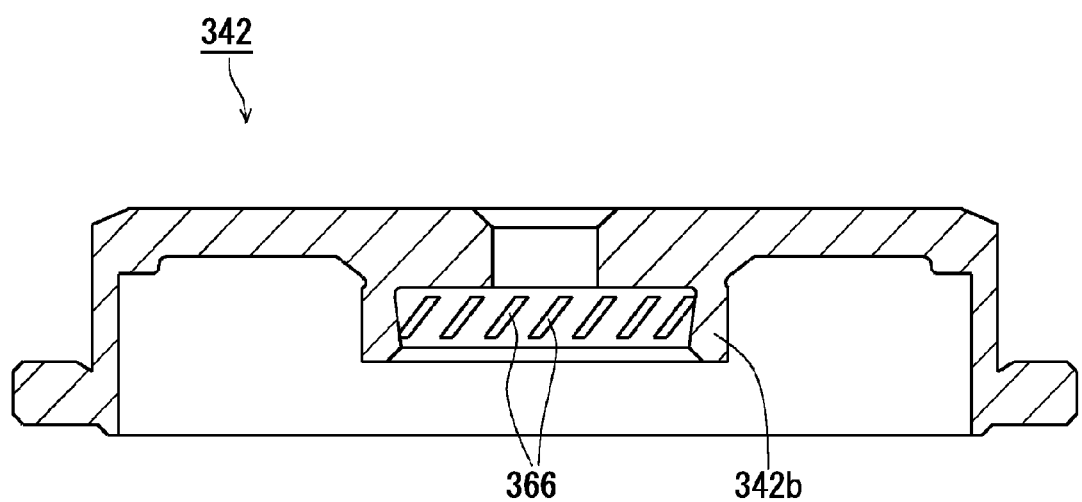
FIG. 17 is a schematic cross-sectional view of a hub according to a preferred embodiment of the present invention.

FIG. 17 is a schematic cross-sectional view of the hub 342 illustrated in FIG. 16. As illustrated in FIG. 17, a second dynamic pressure groove array 366 is arranged in the inner circumferential surface of the protruding portion 342b of the hub 342. In addition, an end of the second dynamic pressure groove array 366 which is arranged closer to the liquid surface 351a is arranged radially inward of an end of the second dynamic pressure groove array 366 which is arranged closer to an interior of the fluid dynamic bearing mechanism 305. Therefore, in the vicinity of the second dynamic pressure groove array 366, the lubricating oil 351 is preferably drawn toward the interior of the fluid dynamic bearing mechanism 305 by the action of both the second dynamic pressure groove array 366 and a centrifugal force.

Note that it is enough that the second dynamic pressure groove array 366 be arranged in at least one of the outer circumferential surface of the sleeve 337 and the inner circumferential surface of the protruding portion 342b of the hub 342, and that the second dynamic pressure groove array 366 may be arranged in both of the outer circumferential surface of the sleeve 337 and the inner circumferential surface of the protruding portion 342b of the hub 342.

Figure 18:
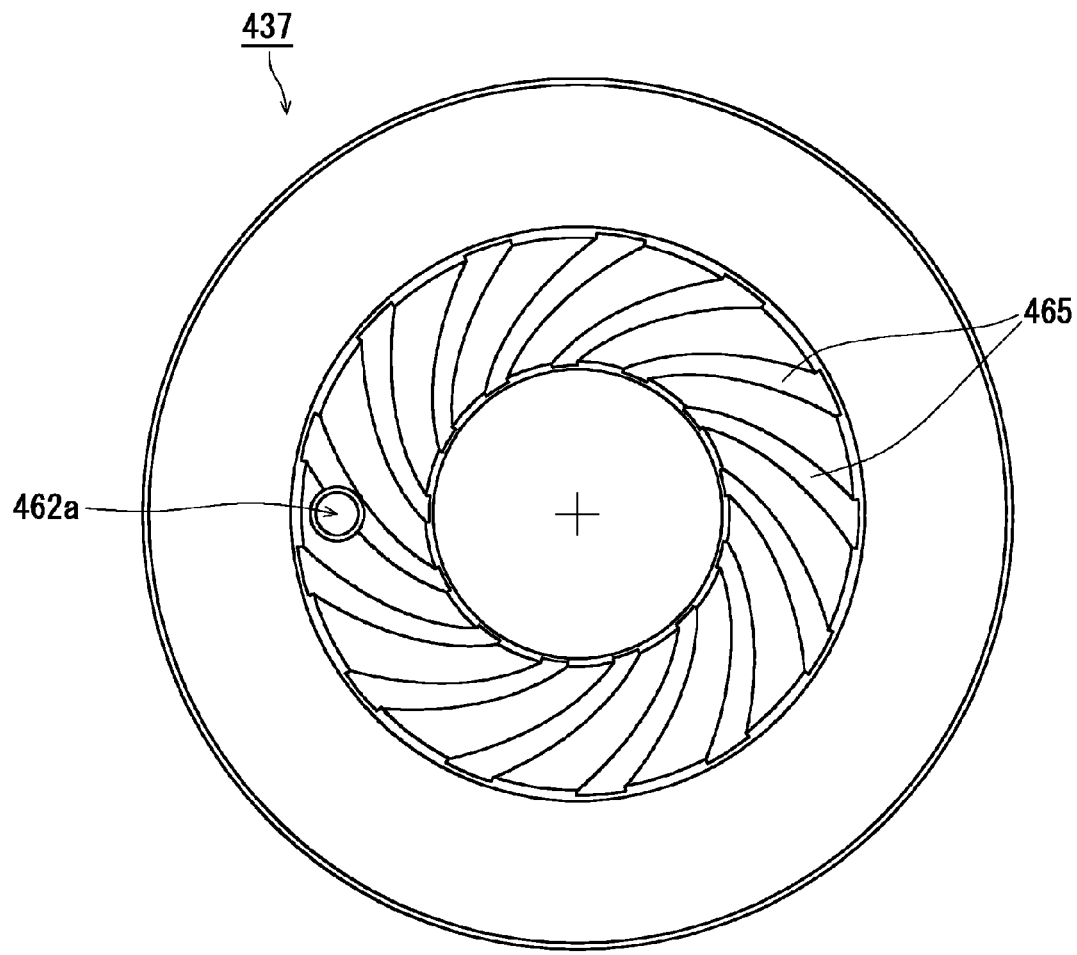
FIG. 18 is a schematic top view of a sleeve according to a preferred embodiment of the present invention.

FIG. 18 is a schematic top view of a sleeve 437 according to another example modification. As illustrated in FIG. 18, an upper end opening 462a of a communicating channel is arranged to overlap with a first dynamic pressure groove array 465 in a radial direction. Even with this arrangement, the upper end opening 462a is arranged closer to the liquid surface of the lubricating oil than it would be if it were arranged radially inward of the first dynamic pressure groove array. This contributes to promoting the discharge of any air bubble from a vicinity of the upper end opening 462a to the liquid surface. In short, a minimum requirement of the upper end opening of the communicating channel is that it is arranged radially outward of a radially inner end of the first dynamic pressure groove array.

Figure 19:
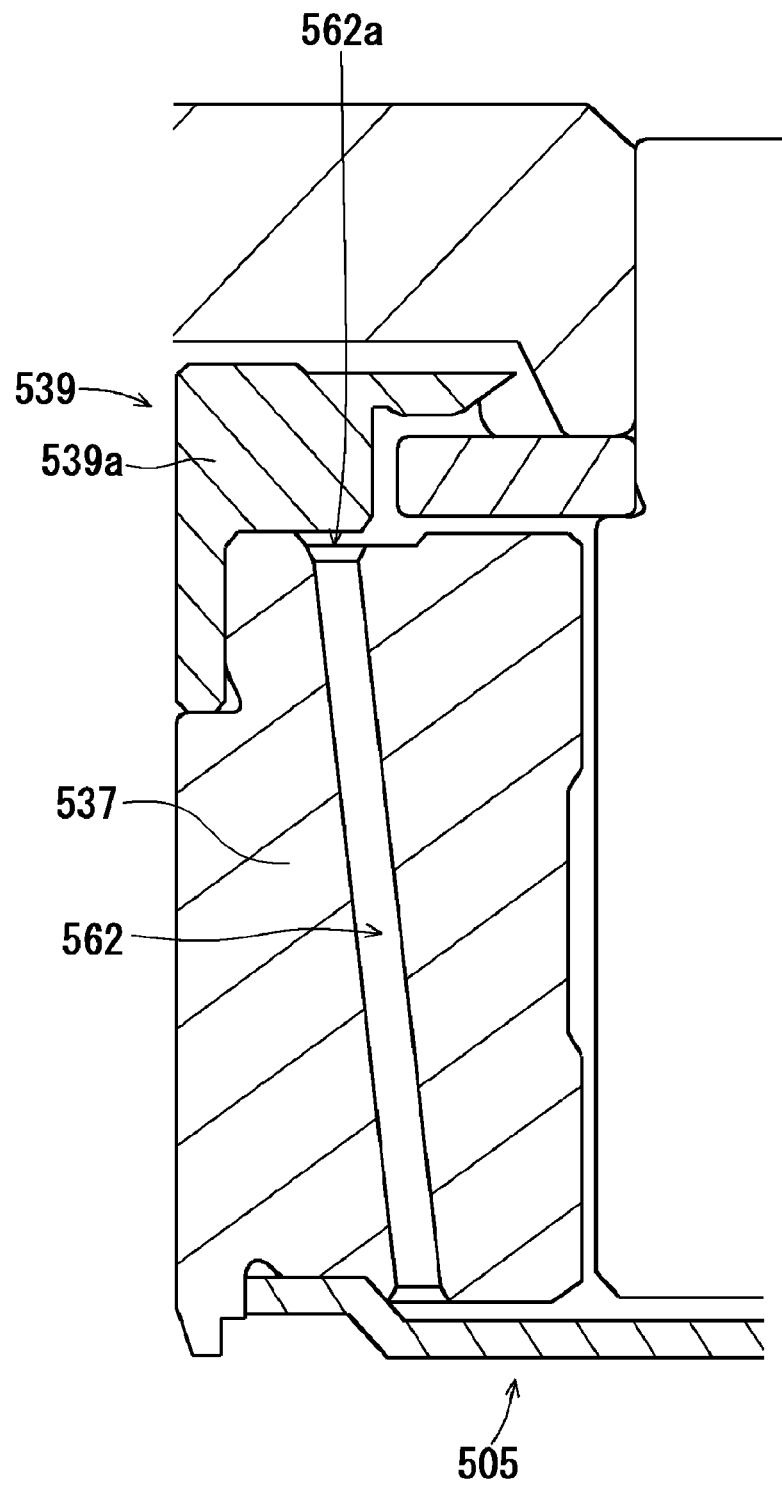
FIG. 19 is a schematic partial cross-sectional view of a spindle motor according to a preferred embodiment of the present invention.

FIG. 19 is a schematic partial cross-sectional view of a spindle motor according to yet another example modification, illustrating a fluid dynamic bearing mechanism 505 therein and its vicinity. In the example modification illustrated in FIG. 19, an upper end opening 562a of a communicating channel 562 is arranged to be open in the direction of a lower surface of a wall portion 539a of a cap 539. When the upper end opening 562a is arranged to face a portion of a stationary bearing portion, existence of a minute projection in an edge portion of the upper end opening 562a would not lead to a contact of the projection with a rotating bearing portion. Therefore, both a need to check whether there is a projection in the vicinity of the upper end opening 562a, and a need to remove any such projection, during production of a sleeve 537 are reduced.

Also note that a sleeve may be arranged inside a sleeve housing having a bottom and being substantially cylindrical, according to yet another example modification. In this case, a cap as used in the above-described preferred embodiment may be arranged to define a portion of the sleeve housing. Also, a communicating channel may be arranged between an outer circumferential surface of the sleeve and an inner circumferential surface of the sleeve housing.

The present invention is also applicable to fluid dynamic bearing mechanisms, spindle motors, and disk drive apparatuses which are designed to rotate other types of disks than magnetic disks, such as an optical disk, for example.

Note that elements in any of the above-described preferred embodiments and the example modifications thereof may be combined together appropriately as long as no conflict arises.

The present invention is applicable to spindle motors including a communicating channel, disk drive apparatuses, and fluid dynamic bearing mechanisms, for example.

Only selected preferred embodiments have been chosen to illustrate the present invention. To those skilled in the art, however, it will be apparent from the foregoing disclosure that various changes and modifications can be made herein without departing from the scope of the present invention as defined in the appended claims. Furthermore, the foregoing description of the preferred embodiments according to the present invention is provided for illustration only, and not for limiting the invention as defined by the appended claims and their equivalents.

What is claimed is:

1. A fluid dynamic bearing mechanism comprising:
a stationary bearing portion; and
a rotating bearing portion supported to be rotatable with respect to the stationary bearing portion; wherein
the rotating bearing portion includes:
　a shaft portion arranged along a central axis and extending in a vertical direction; and
　an outer rotating portion arranged to spread radially outward from an outer circumferential surface of the shaft portion;
the stationary bearing portion includes a sleeve portion, the sleeve portion including an upper surface arranged opposite a lower surface of the outer rotating portion, and a bearing hole arranged opposite the shaft portion;
a lubricating oil is arranged between the stationary and rotating bearing portions;
a liquid surface of the lubricating oil is arranged between the stationary bearing portion and the outer rotating portion;
the lower surface of the outer rotating portion or the upper surface of the sleeve portion includes a first dynamic pressure groove array arranged therein to induce a dynamic pressure in a substantially radially inward direction in a portion of the lubricating oil which is present between the lower surface of the outer rotating portion and the upper surface of the sleeve portion;
a surface of the outer rotating portion or a surface of the stationary bearing portion includes a second dynamic pressure groove array arranged therein and arranged to induce a dynamic pressure directed to an interior of the fluid dynamic bearing mechanism in a portion of the lubricating oil which is present between the first dynamic pressure groove array and the liquid surface;
an end of the second dynamic pressure groove array which is arranged closer to the liquid surface is arranged radially inward of an end of the second dynamic pressure groove array which is arranged closer to the first dynamic pressure groove array;
the sleeve portion includes a communicating channel arranged to connect an upper end opening arranged in the upper surface of the sleeve portion and a lower end opening arranged in another portion of the sleeve portion, the communicating channel being provided separately from the bearing hole; and the upper end opening is arranged radially outward of a radially inner end of the first dynamic pressure groove array.

2. The fluid dynamic bearing mechanism according to claim 1, wherein a sum total of areas of a plurality of grooves which define the first dynamic pressure groove array is greater than a sum total of areas of a plurality of grooves which define the second dynamic pressure groove array.

3. The fluid dynamic bearing mechanism according to claim 1, wherein a sum total of lengths of a plurality of grooves which define the first dynamic pressure groove array is greater than a sum total of lengths of a plurality of grooves which define the second dynamic pressure groove array.

4. The fluid dynamic bearing mechanism according to claim 1, wherein the upper end opening is arranged radially outward of a radially outer end of the first dynamic pressure groove array.

5. The fluid dynamic bearing mechanism according to claim 1, wherein the upper end opening is arranged to overlap with the first dynamic pressure groove array in a radial direction.

6. The fluid dynamic bearing mechanism according to claim 1, wherein
the lower surface of the outer rotating portion and the upper surface of the sleeve portion include a thrust bearing portion and an annular region arranged therebetween, the thrust bearing portion including the first dynamic pressure groove array, the annular region being arranged radially outward of the thrust bearing portion; and
an axial distance between the lower surface of the outer rotating portion and the upper surface of the sleeve portion in the annular region is greater than an axial distance between the lower surface of the outer rotating portion and the upper surface of the sleeve portion in the thrust bearing portion.

7. The fluid dynamic bearing mechanism according to claim 6, wherein
the upper surface of the sleeve portion includes the first dynamic pressure groove array and an annular surface arranged therein, the annular surface being arranged radially outward of the first dynamic pressure groove array;
a total height of the annular surface is smaller than a total height of bottom surfaces of grooves defining the first dynamic pressure groove array; and
radially outer ends of the grooves defining the first dynamic pressure groove array are arranged to be open in a direction of the annular surface.

8. The fluid dynamic bearing mechanism according to claim 6, wherein the upper end opening is arranged to be open into the annular region.

9. The fluid dynamic bearing mechanism according to claim 1, wherein the upper end opening is arranged to face a portion of the stationary bearing portion.

10. The fluid dynamic bearing mechanism according to claim 1, wherein the second dynamic pressure groove array is arranged in a vicinity of the liquid surface.

11. The fluid dynamic bearing mechanism according to claim 1, wherein the lower end opening is arranged radially inward of the upper end opening.

12. The fluid dynamic bearing mechanism according to claim 1, wherein
the stationary bearing portion includes a closing member arranged to close a lower side of the sleeve portion;
the liquid surface is arranged in an upper portion of a clearance space defined between the stationary and rotating bearing portions; and
a portion of the clearance space defined between the stationary and rotating bearing portions which is arranged at levels lower than a level of the liquid surface, is filled with the lubricating oil.

13. The fluid dynamic bearing mechanism according to claim 1, wherein
the sleeve portion includes:
a sleeve cylindrical portion which is substantially in a shape of a cylinder; and
a flange portion arranged to project radially outward from an upper end portion of an outer circumferential surface of the sleeve cylindrical portion;
the outer rotating portion includes a flange receiving portion including an upper surface arranged opposite a lower surface of the flange portion;
the liquid surface of the lubricating oil is arranged between the outer circumferential surface of the sleeve cylindrical portion and an inner circumferential surface of the flange receiving portion; and
the second dynamic pressure groove array is arranged in the lower surface of the flange portion or the upper surface of the flange receiving portion.

14. The fluid dynamic bearing mechanism according to claim 1, wherein
the outer rotating portion includes a substantially flat plate portion including a lower surface arranged opposite the upper surface of the sleeve portion;
the stationary bearing portion includes a cap portion including a lower surface arranged opposite an upper surface of the plate portion;
the liquid surface of the lubricating oil is arranged between the upper surface of the plate portion and the lower surface of the cap portion; and
the second dynamic pressure groove array is arranged in the upper surface of the plate portion or the lower surface of the cap portion.

15. The fluid dynamic bearing mechanism according to claim 14, wherein
a radial distance across a gap defined radially outside the plate portion is greater than an axial distance between the lower surface of the plate portion and the upper surface of the sleeve portion in a region where the first dynamic pressure groove array is arranged; and
a radially outermost portion of an edge portion of the upper end opening is arranged radially outward of an outer circumferential portion of the plate portion.

16. The fluid dynamic bearing mechanism according to claim 14, wherein a distance between the upper surface of the plate portion and the lower surface of the cap portion in a region where the second dynamic pressure groove array is arranged is greater than a distance between the lower surface of the plate portion and the upper surface of the sleeve portion in a region where the first dynamic pressure groove array is arranged.

17. A spindle motor comprising:
a stationary portion; and
a rotating portion supported to be rotatable with respect to the stationary portion through the fluid dynamic bearing mechanism of claim 1; wherein
the stationary portion includes a stator arranged to generate magnetic flux; and the rotating portion includes a magnet arranged radially opposite the stator.

18. The spindle motor according to claim 17, wherein the stationary portion further includes a magnetic member arranged below the magnet to produce a magnetic attraction force in relation to the magnet.

19. The spindle motor according to claim 17, wherein an axial magnetic center of the stator is arranged at a level lower than that of an axial magnetic center of the magnet.

20. A disk drive apparatus comprising:
the spindle motor of claim 17;
an access portion arranged to perform at least one of reading and writing of information from or to a disk supported by the rotating portion of the spindle motor; and
a housing arranged to contain the spindle motor and the access portion.

* * * * *